US012619392B2

(12) United States Patent
Wang et al.

(10) Patent No.: US 12,619,392 B2
(45) Date of Patent: May 5, 2026

(54) DISPLAY METHOD AND ELECTRONIC DEVICE

(71) Applicant: HUAWEI TECHNOLOGIES CO., LTD., Guangdong (CN)

(72) Inventors: Bo Wang, Wuhan (CN); Qianqiao Hu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/562,331

(22) PCT Filed: Mar. 30, 2022

(86) PCT No.: PCT/CN2022/083911
§ 371 (c)(1),
(2) Date: Nov. 20, 2023

(87) PCT Pub. No.: WO2022/242326
PCT Pub. Date: Nov. 24, 2022

(65) Prior Publication Data
US 2024/0248671 A1     Jul. 25, 2024

(30) Foreign Application Priority Data

May 19, 2021    (CN) .......................... 202110550254.0
Aug. 13, 2021    (CN) .......................... 202110930452.X

(51) Int. Cl.
*G06F 3/041*          (2006.01)
*G06F 3/14*           (2006.01)
(52) U.S. Cl.
CPC .................................. *G06F 3/1462* (2013.01)

(58) Field of Classification Search
CPC .... G06F 3/1462; G06F 3/1454; G06F 3/0481; G06F 9/451; G06F 1/3234; G06F 9/461; G09G 2340/0407; G09G 2340/0464; G09G 5/14; H04N 21/41407; H04N 21/4438
See application file for complete search history.

(56) References Cited

U.S. PATENT DOCUMENTS

| | | | |
|---|---|---|---|
| 10,453,325 B2 * | 10/2019 | Adler ...................... | G06F 16/86 |
| 10,962,795 B1 * | 3/2021 | Gollier ................. | G02B 27/283 |
| 2012/0226742 A1 * | 9/2012 | Momchilov ........... | G06F 3/048 |
| | | | 709/203 |

(Continued)

FOREIGN PATENT DOCUMENTS

| | | |
|---|---|---|
| CN | 106055327 A | 10/2016 |
| CN | 111857925 A | 10/2020 |

*Primary Examiner* — Md Saiful A Siddiqui

(57) ABSTRACT

This application provides a display method and an electronic device. The method is applied to a first electronic device, and the method may include: The first electronic device detects a first operation of starting a first application. The first electronic device matches a window of the first application; and when the first electronic device determines that the matched window of the first application is located in the first electronic device, migrates the window of the first application to a second electronic device for display. The technical solutions can be applied to projection technologies. When an application is switched from the first electronic device to the second electronic device for display, data and a status of the application can be retained to avoid restarting the application.

16 Claims, 16 Drawing Sheets

A first electronic device detects an operation of starting a first application — 610

Match a window of the first application — 620

When the first electronic device determines that the matched window of the first application is located in the first electronic device, migrate the window of the first application to a second electronic device for display — 630

(56)　　　　　　　References Cited

U.S. PATENT DOCUMENTS

| | | | |
|---|---|---|---|
| 2013/0214995 A1* | 8/2013 | Lewin | G06F 3/0484 |
| | | | 345/1.3 |
| 2013/0278484 A1* | 10/2013 | Hwang | G06F 3/1423 |
| | | | 345/2.3 |
| 2015/0170212 A1* | 6/2015 | McGie | G06Q 30/0251 |
| | | | 705/14.64 |
| 2016/0054862 A1 | 2/2016 | Reeves et al. | |
| 2016/0182603 A1 | 6/2016 | Chung et al. | |
| 2019/0294400 A1* | 9/2019 | Lee | G06F 21/83 |
| 2021/0349610 A1* | 11/2021 | Suh | G06F 3/0488 |
| 2022/0027117 A1* | 1/2022 | Liu | G06F 3/0482 |
| 2023/0236721 A1* | 7/2023 | Ökvist | G06F 1/1647 |
| | | | 715/863 |
| 2023/0403894 A1* | 12/2023 | Wang | H10K 59/131 |

* cited by examiner

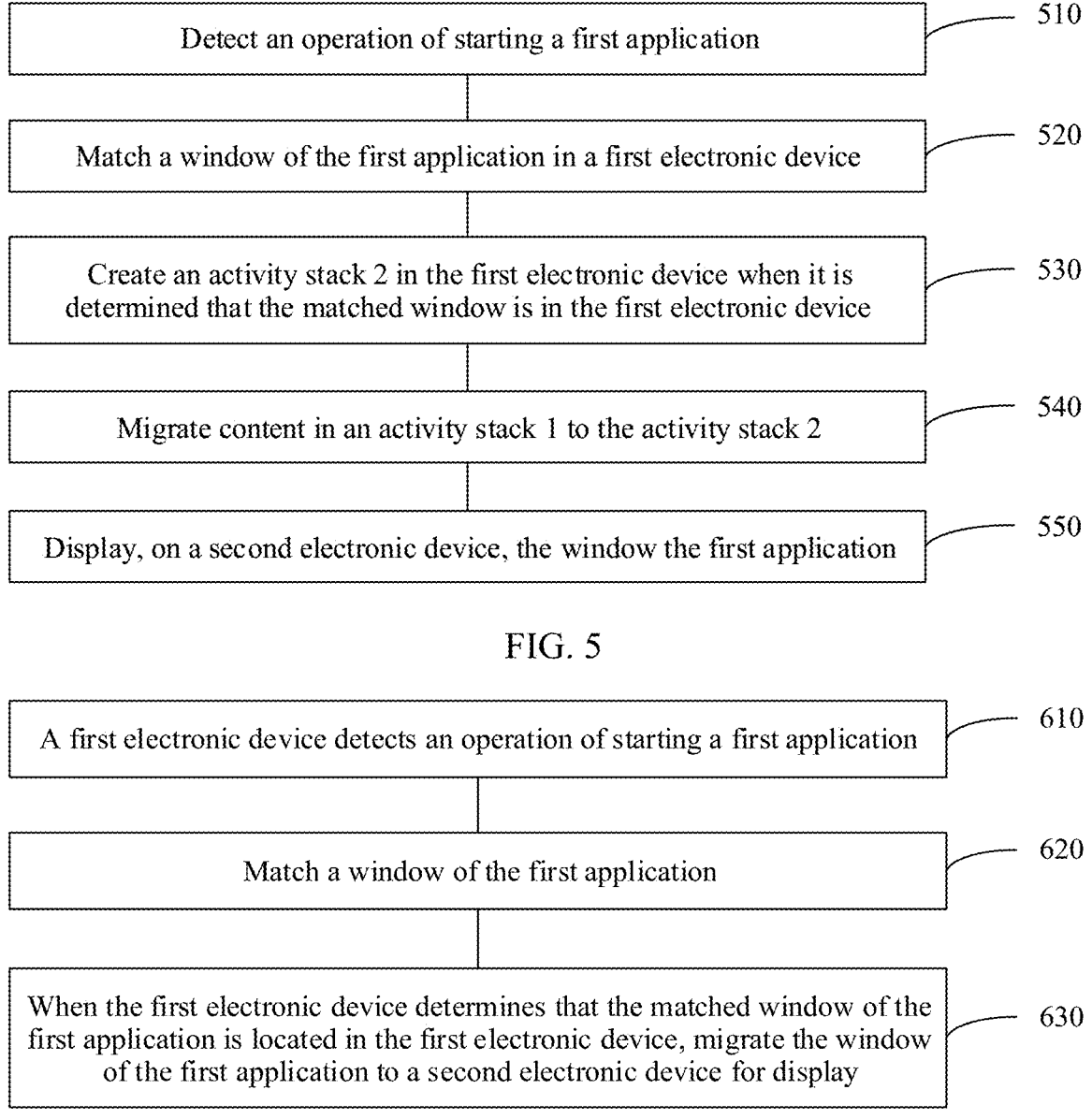

Detect an operation of starting a first application — 510

Match a window of the first application in a first electronic device — 520

Create an activity stack 2 in the first electronic device when it is determined that the matched window is in the first electronic device — 530

Migrate content in an activity stack 1 to the activity stack 2 — 540

Display, on a second electronic device, the window the first application — 550

FIG. 5

A first electronic device detects an operation of starting a first application — 610

Match a window of the first application — 620

When the first electronic device determines that the matched window of the first application is located in the first electronic device, migrate the window of the first application to a second electronic device for display — 630

FIG. 6

DISPLAY METHOD AND ELECTRONIC DEVICE

CROSS-REFERENCE TO RELATED APPLICATIONS

This application is a National Stage of International Application No. PCT/CN2022/083911 filed on Mar. 30, 2022, which claims priority to Chinese Patent Application No. 202110550254.0 filed on May 19, 2021 and claims priority to Chinese Patent Application No. 202110930452.X filed on Aug. 13, 2021. All of the aforementioned patent applications are hereby incorporated by reference in their entireties.

TECHNICAL FIELD

This application relates to the field of electronic technologies, and more specifically, to a display method and an electronic device.

BACKGROUND

In a projection scenario, for example, a first electronic device is projected to a second electronic device. To be specific, content of a screen of the first electronic device needs to be displayed on a screen of the second electronic device.

When an application is switched from the screen of the first electronic device to the screen of the second electronic device for display, the first electronic device usually restarts the application and then displays the restarted application on the screen of the second electronic device, resulting in a data loss of the application. For example, the application is HUAWEI Video. When the first electronic device starts HUAWEI Video to play a video, and in this case, HUAWEI Video is switched to the screen of the second electronic device for display, HUAWEI Video needs to be started again, and the video that is originally being played on the first electronic device cannot continue to be played on the second electronic device.

SUMMARY

This application provides a display method and an electronic device. In this technical solution, when an application is switched from an electronic device to another electronic device for display, a status of the application can be retained to avoid restarting the application.

According to a first aspect, a display method is provided. The method is applied to an electronic device, and the method includes: A first electronic device detects a first operation of starting a first application. The first electronic device matches a window of the first application: and when the first electronic device determines that the matched window of the first application is located in the first electronic device, migrates the window of the first application to a second electronic device for display.

In an embodiment of this application, after detecting an operation of starting a first application, a first electronic device matches a window of the first application in windows of applications that have been started. When determining that the matched window of the first application is in the first electronic device, the window of the first application is migrated to a second electronic device for display. In this technical solution, when an application is switched from a first electronic device to a second electronic device for display, data and a status of the application can be retained to avoid restarting the application.

With reference to the first aspect, in some implementations of the first aspect, the migrating the window of the first application to the second electronic device for display includes: The first electronic device migrates content in a first activity stack corresponding to the window of the first application to a second activity stack. The first electronic device sends data of a window corresponding to the second activity stack to the second electronic device.

It should be understood that the second activity stack may be newly created by the first electronic device, and the second activity stack serves the second electronic device, so that a plurality of electronic devices can be managed by stack, thereby avoiding a restarting phenomenon that occurs when an application is switched from an electronic device to another electronic device for display.

In an embodiment of this application, the first electronic device migrates the content in the first activity stack corresponding to the window of the first application to the second activity stack, so that a task and an activity record in the first activity stack can be retained, that is, data of the first application can be stored. In this way: when the first application is switched to the second electronic device for display, the data of the first application is not lost, thereby improving application continuity.

Optionally: the method may further include: The first electronic device removes the first activity stack. Therefore, system power consumption of the electronic device can be reduced.

With reference to the first aspect, in some implementations of the first aspect, that the first electronic device matches a window of the first application includes: The first electronic device matches, based on first information, the window of the first application from windows of applications that have been started in the first electronic device.

In this technical solution, it may be determined whether the window of the first application has been started in the first electronic device.

With reference to the first aspect, in some implementations of the first aspect, the first information includes at least one piece of the following information: a package name of the started application: a user identity of the started application: and an activity corresponding to the started application.

With reference to the first aspect, in some implementations of the first aspect, the window of the first application displayed on the second electronic device further includes a title bar, and the title bar includes at least an application name of the first application.

With reference to the first aspect, in some implementations of the first aspect, a size of the window of the first application displayed on the second electronic device is different from a size of the window of the first application displayed on the second electronic device.

With reference to the first aspect, in some implementations of the first aspect, the size of the window of the first application displayed on the second electronic device is adjustable.

In this technical solution, a user may adjust the size of the window of the first application as required, so that user experience can be effectively improved.

With reference to the first aspect, in some implementations of the first aspect, the method further includes: when the first electronic device determines that the matched window of the first application is located in the second electronic device, placing the window of the first application on a foreground for display.

In this technical solution, when the window of the first application has been projected to the second electronic device, the window of the first application is displayed on the foreground.

With reference to the first aspect, in some implementations of the first aspect, the method further includes: The first electronic device sets pixels per inch of a screen of the second electronic device to be the same as pixels per inch of a screen of the first electronic device.

It should be understood that, when the first electronic device establishes a connection relationship with the second electronic device, the first electronic device may set the pixels per inch of the screen of the second electronic device to be the same as the pixels per inch of the screen of the first electronic device. This helps ensure a display effect of projection.

With reference to the first aspect, in some implementations of the first aspect, the method further includes: The first electronic device detects a state change of the second electronic device. The first electronic device intercepts a message that is used for interface relaunching and that is sent by the first electronic device to the first application based on the state change.

In this technical solution, a display interface corresponding to the window of the first application may be prevented from being relaunched due to a state change of the second electronic device.

Optionally: when the foregoing state change of the first electronic device occurs, and a system sends, to the first application, a message for relaunching an interface, the first electronic device may also intercept the message.

With reference to the first aspect, in some implementations of the first aspect, the first operation is triggered on the first electronic device, or the first operation is triggered on the second electronic device.

With reference to the first aspect, in some implementations of the first aspect, the method further includes: The first electronic device determines whether the first application supports a change of a display interface size of a window: When it is determined that the first application supports a change of a display interface size of a window: the migrating the window of the first application to the second electronic device for display includes: migrating the window of the first application to the second electronic device in a form of a floating window for display.

Based on this embodiment of this application, when the first electronic device determines that the first application supports a change of a display interface size of a window, the window of the first application may be displayed on the second electronic device in the form of a floating window: so that user experience can be improved.

Optionally, when it is determined that the first application supports a change of a display interface size of a window: a position of an interface element in the window of the first application may also change or may be adjusted.

According to a second aspect, an electronic device is provided, including one or more processors and one or more memories. The one or more memories store one or more computer programs, the one or more computer programs include instructions, and when the instructions are executed by the one or more processors, the display method according to the foregoing first aspect and any one of the possible implementations is performed.

According to a third aspect, a chip is provided. The chip includes a processor and a communication interface, the communication interface is configured to receive a signal and transmit the signal to the processor, and the processor processes the signal, the display method according to the foregoing first aspect and any one of the possible implementations is performed.

According to a fourth aspect, a computer-readable storage medium is provided. The computer-readable storage medium stores computer instructions, and when the computer instructions are run on an electronic device, the display method according to the foregoing first aspect and any one of the possible implementations is performed.

According to a fifth aspect, a computer program product is provided. The computer program product includes computer program code, and when the computer program code is executed on a computer, the display method according to the foregoing first aspect and any one of the possible implementations is performed.

BRIEF DESCRIPTION OF DRAWINGS

FIG. 3(*a*)-1 to FIG. 3(*b*)-2 are schematic diagrams of another group of GUIs according to an embodiment of this application:

FIG. 5 is a schematic flowchart of a display method according to an embodiment of this application: and FIG. 6 is a schematic flowchart of a display method according to an embodiment of this application.

DESCRIPTION OF EMBODIMENTS

Figures 1, 1A:
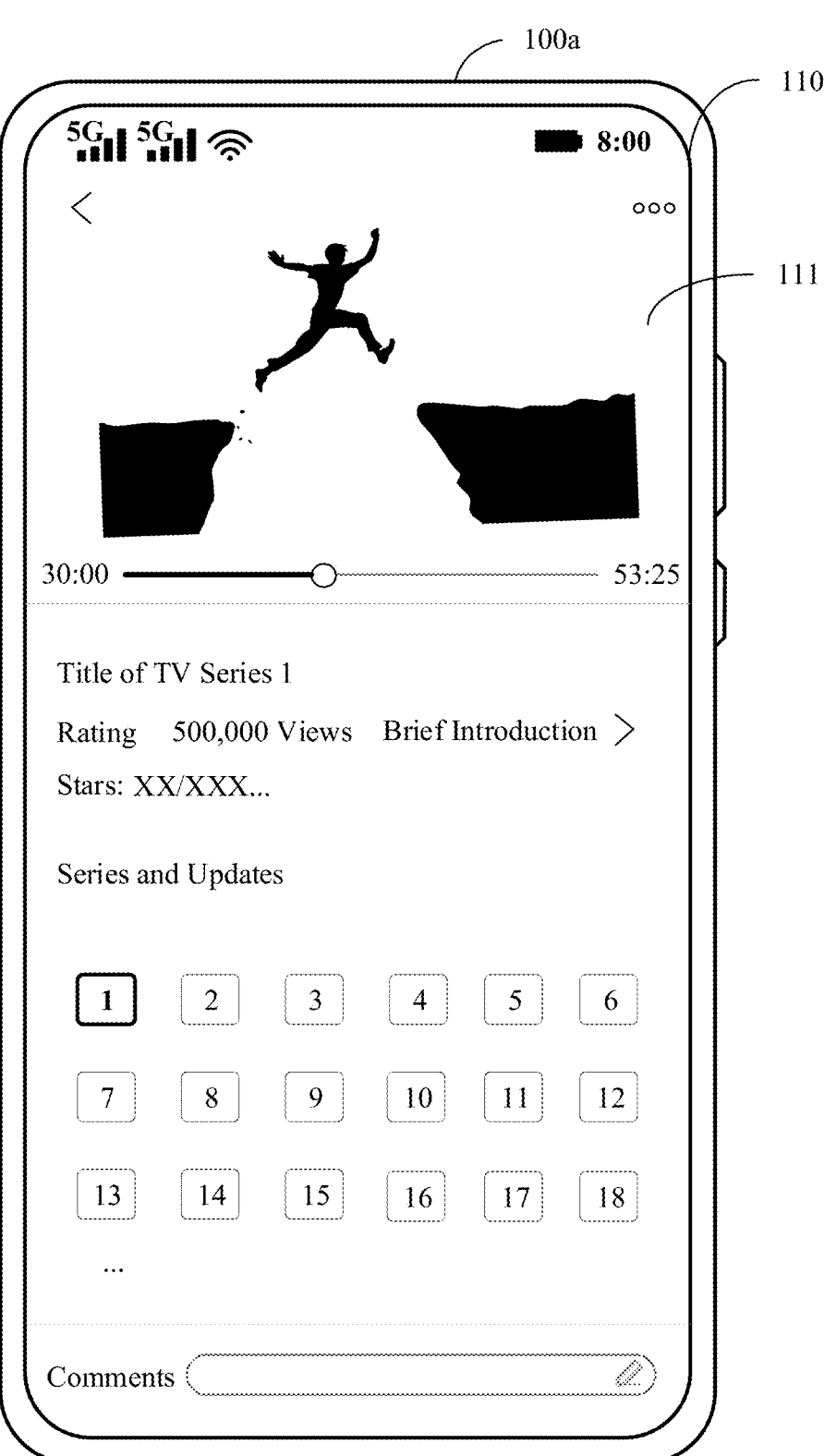
FIG. 1(*a*)-1 to FIG. 1(*c*)-2 are schematic diagrams of a group of GUIs according to an embodiment of this application.

The following describes technical solutions of this application with reference to accompanying drawings.

A display method in embodiments of this application may be applied to an electronic device such as a smartphone, a tablet computer, a notebook computer, a personal computer (personal computer, PC), an ultra-mobile personal computer (ultra-mobile personal computer, UMPC), a netbook, a personal digital assistant (personal digital assistant, PDA), a vehicle-mounted device, or a wearable device. The display method in embodiments of this application may be further applied to a display device such as a display, a television, or a projector. A specific type of the electronic device is not limited in embodiments of this application.

Before the technical solutions of this application are described, some technical terms that may be related in this application are first briefly described.

Activity (activity): In an Android (android) system, an activity is a component that may include a user interface, and is mainly used to interact with a user, such as making a call, taking a photo, sending an email, and viewing a map. In brief, most of content that can be viewed by a user in an application is provided by an activity component. An application may include a plurality of activities.

Task (task): A task (task) is usually a set of a series of associated activities. These activities are arranged in a stack (stack) based on their respective starting sequence. A home screen of an electronic device is usually a start point of a task. When an activity 2 is started in a current activity 1, the activity 2 is generally pushed to the top of a stack and becomes a focus. The previous activity 1 is still in the stack, but is in a suspended state. When the activity 1 is suspended, a system retains a current state of a corresponding user interface. When a user clicks "Back", the current activity 2 at the top of the stack is destroyed and the activity 1 is resumed.

Activity record (activity record): Activity records are an activity record table of an activity manager service (activity manager service. AMS) of an Android system. Each activity record corresponds to an activity.

In a projection application scenario, for example, a first electronic device is projected to a second electronic device. To be specific, content of a screen of the first electronic device needs to be displayed on a screen of the second electronic device.

When an application is switched from the screen of the first electronic device to the screen of the second electronic device, the first electronic device generally restarts the application and then displays the restarted application on the screen of the second electronic device. In this case, an original display interface of the application cannot be retained. For example, the application is HUAWEI Video. When the second electronic device opens HUAWEI Video to play a video, for example, the video is played to the fifth minute, and in this case, a play interface of HUAWEI Video is switched to the screen of a first electronic device. HUAWEI Video needs to be started again, and the original video cannot be continued to be played on the second electronic device, resulting in a data loss of the application.

In view of this, an embodiment of this application provides a display method. In this technical solution, when an application is switched from a first electronic device to a second electronic device for display, a status of the application can be retained to avoid restarting the application.

In this embodiment of this application, an example in which the first electronic device is a mobile phone and the second electronic device is a PC is used for description. It should be understood that a manner of establishing a connection between the mobile phone and the PC is not limited in this embodiment of this application. For example, the mobile phone may establish a 30) connection to the PC by using a docking station, or the mobile phone may establish a connection to the PC through a connection manner such as a wireless local area network (wireless local area network. WLAN). Bluetooth, an ultra-wideband (ultra wide band. UWB) connection manner, or a wired connection manner.

FIG. 1(*a*)-1 to FIG. 1(*c*)-2 are schematic diagrams of a group of graphical user interfaces (graphical user interfaces. GUIs) according to an embodiment of this application. FIG. 1(*a*)-1 to FIG. 1(*c*)-2 show a process in which a mobile phone projects an application to a PC for display in a desktop mode.

With reference to FIG. 1(*a*)-1 and FIG. 1(*a*)-2, the GUIs show display interfaces of a mobile phone 100*a* and a PC 100*b*. As shown in FIG. 1(*a*)-1 and FIG. 1(*a*)-2, a display interface 110 of the mobile phone 100*a* may be a play interface of HUAWEI Video. The play interface may include a display interface 111 of a TV series 1 that is being played, and content such as a related introduction and episodes of the TV series 1. The display interface 111 may include a play picture and a progress bar.

As shown in FIG. 1(*a*)-1 and FIG. 1(*a*)-2, a display interface 120 of the PC 100*b* may be a home page display interface of the PC, and the display interface 120 may include a status bar, a search box 121, and an application bar 123. The status bar may include a signal indicator, a battery level, a time, and the like. The application bar may include a function key 124 and a plurality of application icons. A user may search for content such as an application, a web page, and a document by using the search box 121. When the user clicks the function key 124 by using a mouse, the PC 100*b* may display, in a pop-up interface, a plurality of applications installed on the mobile phone. In some cases, when there are many applications installed on the mobile phone, the user may perform a page flipping operation on the pop-up interface to display more applications.

After the PC 100*b* detects an operation of clicking an application icon 122 of HUAWEI Video by the user by using a mouse, the mobile phone and the PC may display GUIs shown in FIG. 1(*b*)-1 and FIG. 1(*b*)-2.

With reference to FIG. 1(*b*)-1 and FIG. 1(*b*)-2, the GUIs may include a display desktop 140 of the mobile phone 100*a* and a display interface 150 of the PC. The display desktop 140 of the mobile phone 100*a* may include a plurality of applications installed on the mobile phone, for example. Calendar. Clock. Health, and HUAWEI video.

The display interface 150 of the PC 100*b* includes a display interface 130 of HUAWEI Video, and the display interface 130 includes a title bar 130*a* and a content display section 130*b*. The title bar 130*a* may include a text "HUAWEI Video", and controls that can control the display interface 130, such as a minimize control 131, a maximize control 132, and a close control 133. Content displayed on the content display section 130*b* is the same as that displayed on the display interface 110 of the mobile phone, and a picture in the display interface may continue to be played based on a play record of the picture on the mobile phone. That is, when the play interface of the application "HUAWEI Video" is switched from the mobile phone to the PC for display, the application may retain a state before the switching, instead of being restarted.

After the mobile phone detects an operation of tapping an application icon 112 of HUAWEI Video by the user, the mobile phone and the PC may display GUIs shown in FIG. 1(*c*)-1 and FIG. 1(*c*)-2.

It should be understood that, in this embodiment, HUAWEI Video in FIG. 1(*a*)-1 and FIG. 1(*a*)-2 is started on the desktop of the mobile phone. In some other embodiments, if HUAWEI Video is started in an interface of a third-party application, in FIG. 1(*b*)-1 and FIG. 1(*b*)-2, the mobile phone 100*a* may display an interface of the third-party application.

With reference to FIG. 1(*c*)-1 and FIG. 1(*c*)-2, the GUIs may include the display interface 110 of the mobile phone and the display interface 120 of the PC.

For the GUIs, refer to related descriptions of FIG. 1(*a*)-1 and FIG. 1(*a*)-2. For brevity, details are not described again.

It should be understood that, when the play interface of HUAWEI Video is switched from the PC to the mobile phone, HUAWEI Video may retain a play status of HUAWEI Video. To be specific, HUAWEI Video may continue to be played on the mobile phone based on a play record of HUAWEI Video on the PC, instead of being restarted.

In some other embodiments, an application started on the mobile phone is a document application, and a document is displayed in the interface. When the application is started on the PC, the PC may continue to display a document position of the application on the mobile phone, so that application continuity in a screen switching process can be implemented, thereby improving user experience.

Based on this embodiment of this application, in a desktop mode of a mobile phone, when an application that is being displayed on the mobile phone is started on the PC side, the application may continue to retain a state before switching, for example, a play record or a document reading position. In this way, continuity of switching an application from one screen to another screen can be implemented, to avoid restarting the application and affecting user experience.

Figures 1, 1A, 2:
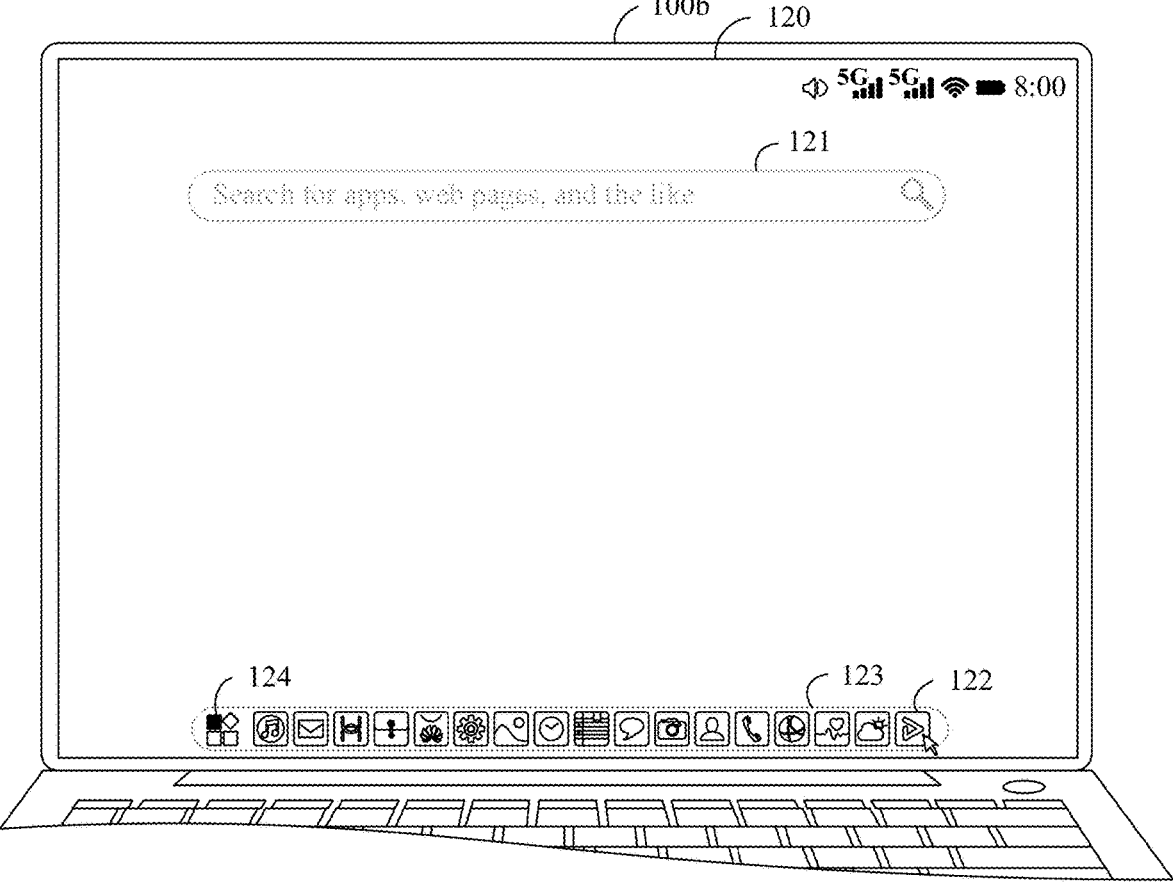
FIG. 2(*a*)-1 to FIG. 2(*b*)-2 are schematic diagrams of another group of GUIs according to an embodiment of this application.
Figures 1, 1B:
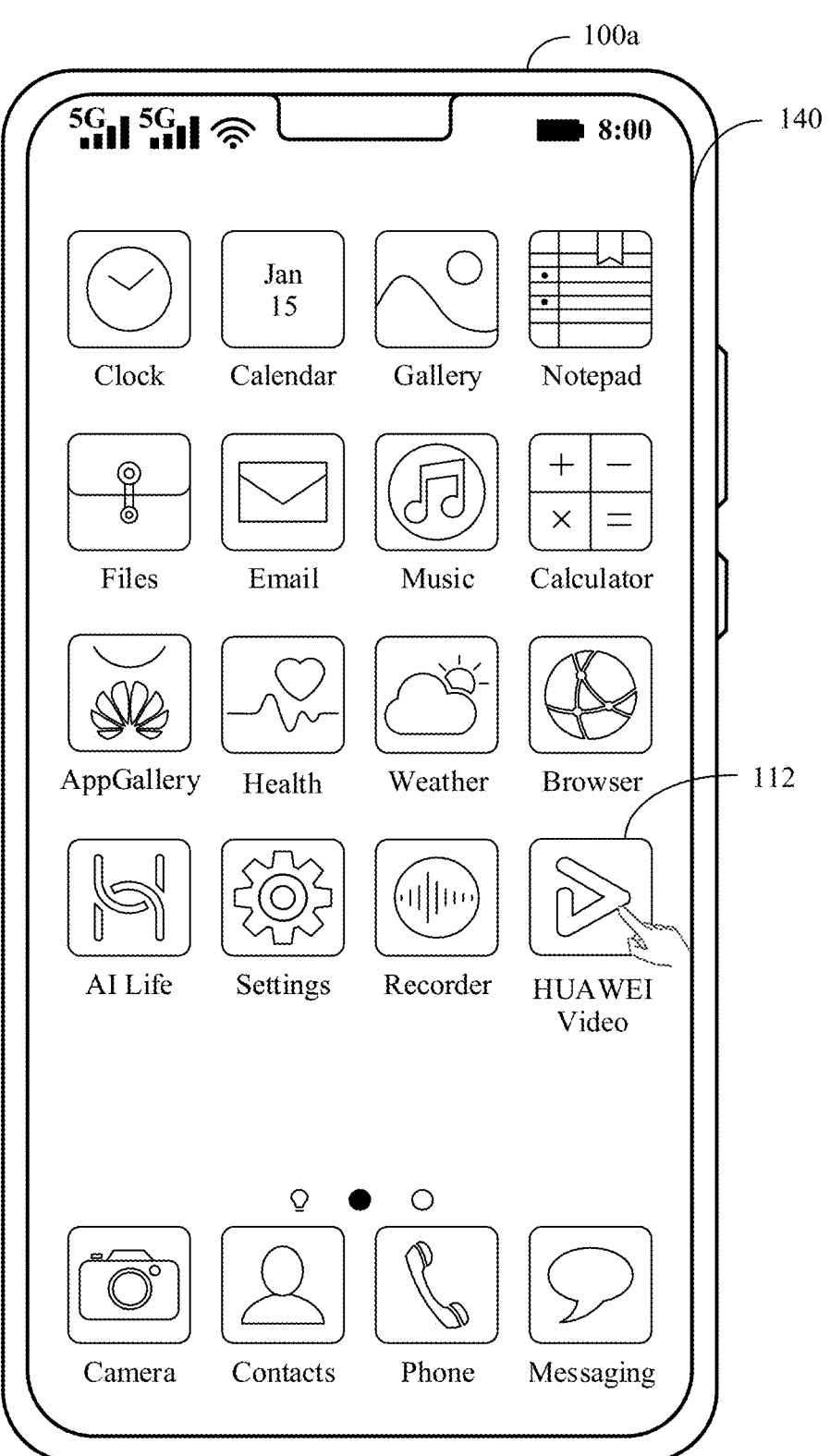
Figures 1, 1B, 2:
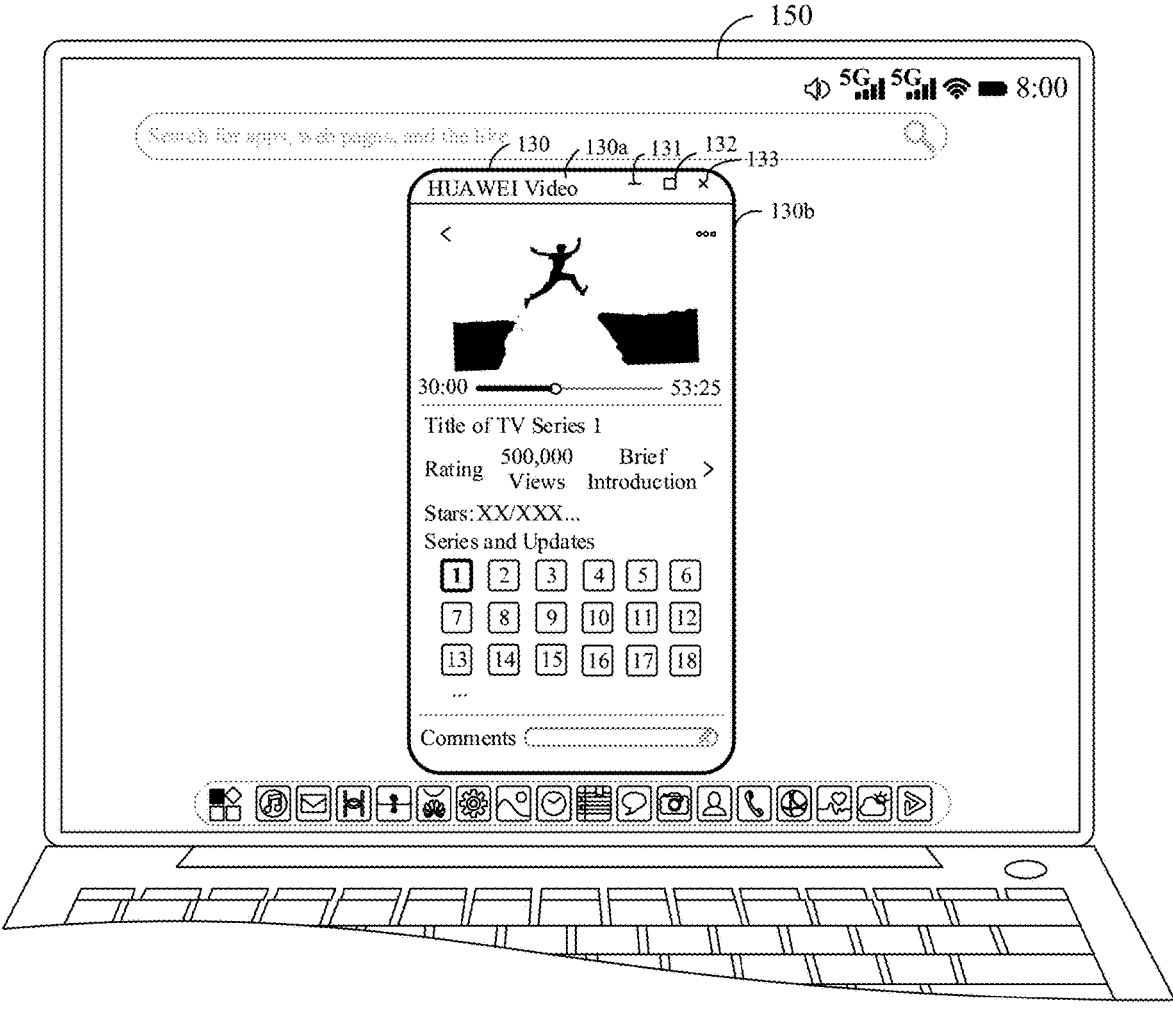
Figures 1, 1C:
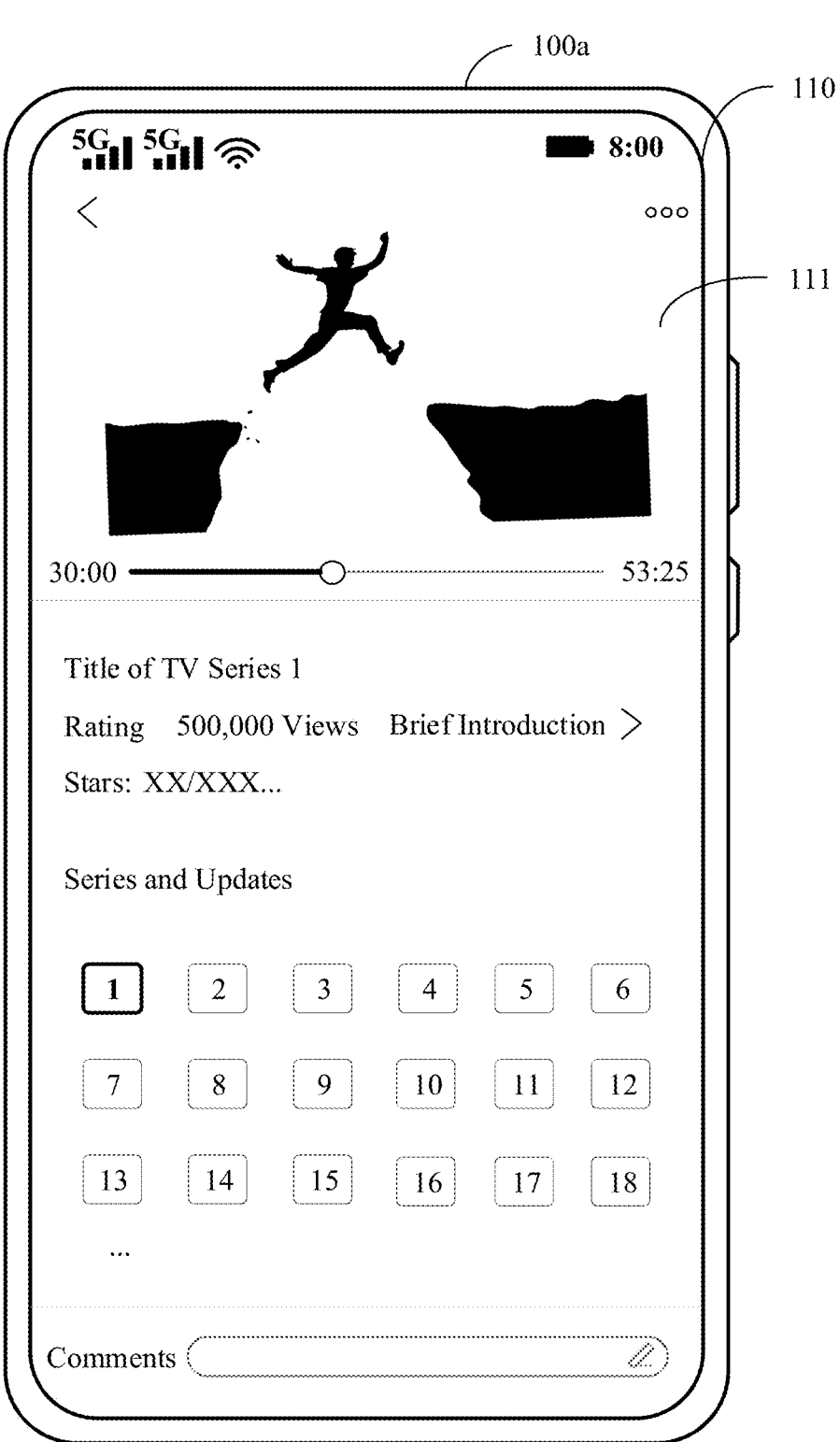
Figures 1, 1C, 2:
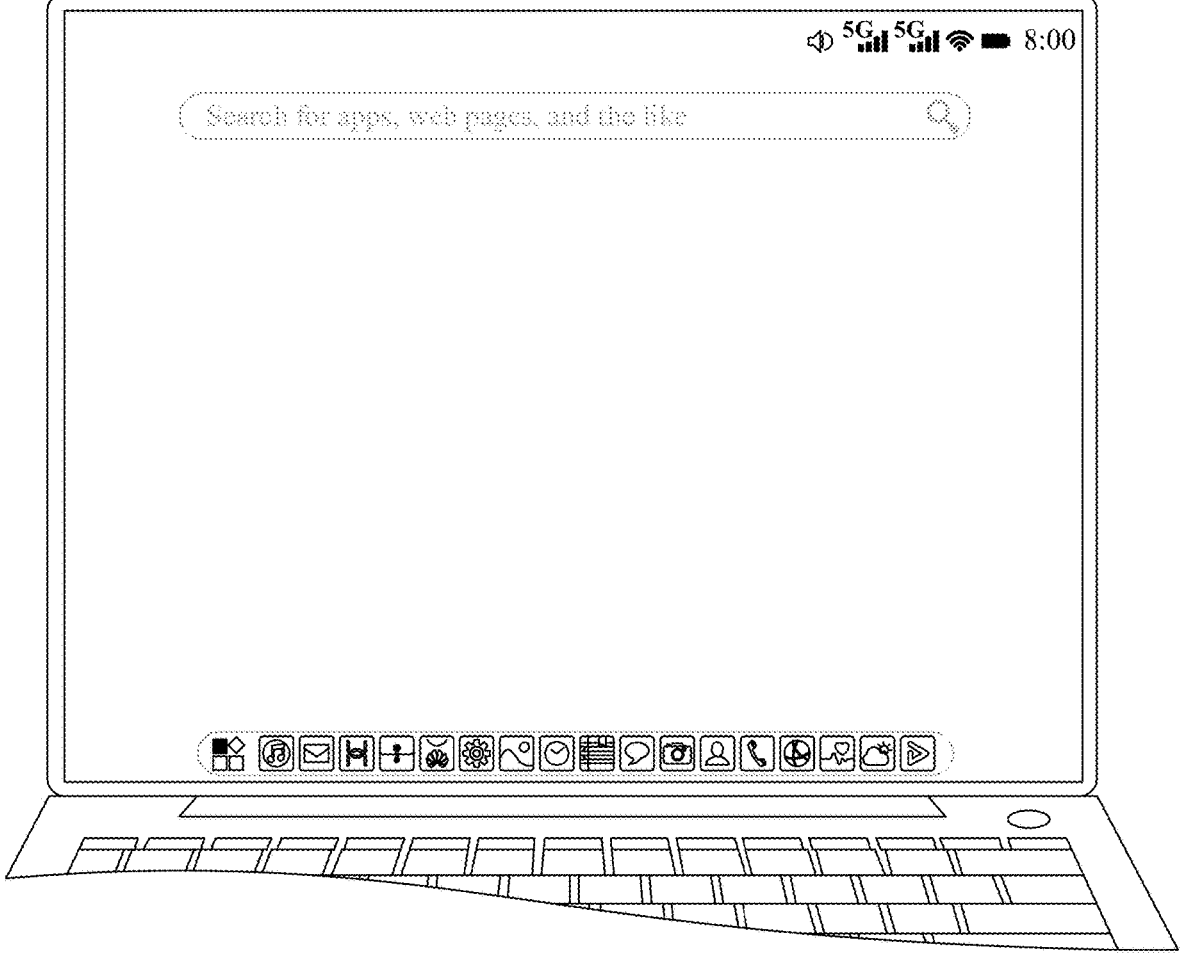

FIG. 2(*a*)-1 to FIG. 2(*b*)-2 are schematic diagrams of another group of GUIs according to an embodiment of this application. FIG. 2(*a*)-1 to FIG. 2(*b*)-2 show a process in which a mobile phone switches a display screen of an application in a desktop mode.

With reference to FIG. 2(*a*)-1 and FIG. 2(*a*)-2, the GUIs show a display desktop 210 of a mobile phone 200*a* and a display interface 220 of a PC 200*b*.

The display desktop 210 of the mobile phone may include application icons of a plurality of applications installed on the mobile phone, such as Music, Email, Health, and AI life.

The display interface 220 of the PC may include a search box, an application bar, a display interface 230 of an APP 1 and a display interface 240) of an APP 1. The APP 1 may be a document application, and the display interface 230 and the display interface 240 may be two documents opened on the PC.

As shown in FIG. 2(*a*)-1 and FIG. 2(*a*)-2, the display interface 230 includes a title bar 230*a* and a content display section 230*b*. The title bar 230*a* may include a text "APP 1", and controls that can control the display interface 230, such as a minimize control 231, a maximize control 232, and a close control 233. The content display section 230*b* may include a title section of a document 1 and a content section of the document 1.

Similarly, the display interface 240 includes a title bar 240*a* and a content display section 240*b*. The title bar 240*a* may include a text "APP 1", and controls that can control the display interface 240, such as a minimize control 241, a maximize control 242, and a close control 243. The content display section 240*b* may include a title section of a document 2 and a content section of the document 2.

In this embodiment of this application, a user may first open the document 1 and then open the document 2, that is, a newly opened document is the document 2.

After the mobile phone detects an operation of tapping an application icon 211 of the APP 1 by the user, the mobile phone and the PC may display GUIs shown in FIG. 2(*b*)-1 and FIG. 2(*b*)-2.

It should be understood that, in this embodiment, when the display interface 230 and the display interface 240 of the APP 1 are opened on the PC 200*b*, the display interface 230 and the display interface 240 may be respectively located in different activity stacks (activity stack). For example, the display interface 230 is located in an activity stack 1, and the display interface 240 is located in an activity stack 2. The activity stack 1 may include a task 1, and the task 1 may include an activity 1 corresponding to the display interface 230. The activity stack 2 may include a task 2, and the task 2 may include an activity 2 corresponding to the display interface 240.

Because the user opens the display interface 230 and the display interface 240 at different times, for example, the user first opens the display interface 230 and then opens the display interface 240, levels corresponding to the activity stack 1 and the activity stack 2 are different. In other words, a level of the activity stack 1 is lower than a level of the activity stack 2, that is, a level of an activity stack corresponding to a newly opened display interface is higher. The level may be understood as a display sequence of the PC, that is, the PC displays an interface corresponding to an activity stack with a higher level.

In this embodiment of this application, because a screen of the PC is larger, a plurality of display interfaces of the APP 1 may be displayed. Although both the display interface 230 and the display interface 240 are displayed on the screen of the PC, the two display interfaces correspond to different levels.

In some possible embodiments, after the mobile phone detects the operation of tapping the application icon 211 of the APP 1 by the user, the mobile phone may migrate, from the PC to the mobile phone for display, a display interface corresponding to an activity stack with a higher level.

For example, a display interface newly opened by the user is the display interface 240, that is, a level of the activity stack 2 corresponding to the display interface 240 is higher. After detecting the operation of tapping the application icon 211 of the APP 1 by the user, the mobile phone may migrate content included in the activity stack 2 corresponding to the display interface 240 to a newly created activity stack 3 in the mobile phone. The content in the activity stack 2 may include a corresponding task and activity, so that the display interface 240 may be migrated to the mobile phone for display, thereby retaining the display interface 240, and avoiding a data loss caused by restart of the APP 1.

In some possible embodiments, after the mobile phone detects the operation of tapping the application icon 211 of the APP 1 by the user, the mobile phone may alternatively migrate display interfaces corresponding to a plurality of activity stacks of the APP 1 to the mobile phone for display:

For example, the mobile phone may migrate the display interface 230 and the display interface 240) to the mobile phone for display, for example, in a split-screen display mode or in a mode of preferably displaying the display interface 240 and displaying the display interface 230 after the display interface 240 is closed.

In some possible embodiments, after the mobile phone detects the operation of tapping the application icon 211 of the APP 1 by the user, the mobile phone may pop up a prompt box, and the user may select either of the display interface 230 and the display interface 240 to be migrated to the mobile phone for display.

Alternatively, the user may select the display interface 230 and the display interface 240 to be migrated to the mobile phone for display. In this way; the display interface 230 and the display interface 240) may be displayed in a split-screen mode in the mobile phone. In this case, both the display interface 230 and the display interface 240 may be displayed in a current interface of the mobile phone. Alternatively, the mobile phone may preferably display the display interface 240) corresponding to an activity stack with a higher level, and place the display interface 230 on a background. In other words, the mobile phone may display the display interface 230 after the display interface 240 is closed.

In some other embodiments, a display interface newly opened by the user is the display interface 240). After the mobile phone detects the operation of tapping the application icon 211 of the APP 1 by the user, the mobile phone may migrate the content included in the activity stack 2 corresponding to the display interface 240 to the mobile phone for display, that is, the mobile 35 phone does not need to create the activity stack 3.

With reference to FIG. 2(*b*)-1 and FIG. 2(*b*)-2, the GUIs show a display interface 250 of a mobile phone 200*a* and a display interface 260 of a PC 200*b*.

The display interface 250 of the mobile phone 200*a* may display content of a newly opened document, that is, content of a display interface 240*b* is displayed in the display interface 250, including a title section of a document 2 and a content section of the document 2.

The display interface 260 of the PC 200*b* includes a display interface 230.

It should be understood that, in this embodiment of this application, the PC may also open three or more documents of the APP 1. In this case, when the user starts the APP 1 on the mobile phone, the mobile phone may also display an interface of a newly opened document.

It should be understood that, in this embodiment of this application, the display interface 230 of the document 1 may retain an original position of the document 1 on a screen of the PC, or the display interface 230 of the document 1 may be moved to the middle of the screen of the PC for display, or the display interface 230 of the document 1 may be displayed on another position of the screen of the PC. This is not limited in this embodiment of this application.

Based on this embodiment of this application, when a plurality of interfaces of a same application are displayed on a PC, and the plurality of interfaces are displayed in a plurality of windows, for example, two or more documents, when the application is started on a mobile phone, an interface of a newly opened document is displayed on a screen of the mobile phone. In this technical solution, application restart is avoided, and continuity of switching an application from one screen to another screen can be implemented.

FIG. 3(*a*)-1 to FIG. 3(*b*)-2 are schematic diagrams of another group of GUIs according to an embodiment of this application. FIG. 3(*a*)-1 to FIG. 3(*b*)-2 show a process in which a mobile phone switches a display screen of an application in a desktop mode.

With reference to FIG. 3(*a*)-1 and FIG. 3(*a*)-2, the GUIs show a display interface 310 of a mobile phone 300*a* and a display interface 320 of a PC 300*b*.

The display interface 310 of the mobile phone 300*a* may be a home page display interface of an APP 1. The display interface 310 may include the APP 1, a search box, a function bar 310*a*, and the like, and an interface corresponding to "Recently opened" on the function bar. Content included in the interface corresponding to "Recently opened" may include a display area 311 and a display area 312. The display area 311 may include an icon of the APP 1, a title of a document 2, and some function controls such as "Favorites". The display area 312 may include an icon of an APP 2, a title of a document 1, and some function controls such as "Favorites".

The display interface 320 of the PC 300*b* may include a status bar, a search box, an application bar, and a display interface 330 and a display interface 340 of the APP 1. The status bar may include a signal indicator, a battery level, a time, and the like of the mobile phone. The APP 1 may be a document application, and the display interface 330 and the display interface 340 may be two documents opened on the PC.

The display interface 330 may include a title bar 330*a* and a content display section 330*b*. The title bar 330*a* may include a text "APP 1", and controls that can control the display interface 330*a*, such as a minimize control 331, a maximize control 332, and a close control 333. The content display section 330*b* may include a title section of the document 1 and a content section of the document 1.

Similarly, the display interface 340) may include a title bar 340*a* and a content display section 340*b*. The title bar

340*a* may include a text "APP 1", and controls that can control the display interface 340*a*, such as a minimize control 341, a maximize control 342, and a close control 343. The content display section 340*b* may include a title section of the document 2 and a content section of the document 2.

After the mobile phone 330*a* detects an operation of tapping the display area 312 by a user, the mobile phone 300*a* and the PC 300*b* may display GUIs shown in FIG. 3(*b*)-1 and FIG. 3(*b*)-2.

It should be understood that, in this embodiment, when the display interface 330 and the display interface 340 of the APP 1 are opened on the PC 300*b*, the display interface 330 and the display interface 340) may be respectively located in different activity stacks. For example, the display interface 330 is located in an activity stack 1, and the display interface 340 is located in an activity stack 2. The activity stack 1 may include a task 1, and the task 1 may include an activity 1 corresponding to the display interface 330. The activity stack 2 may include a task 2, and the task 2 may include an activity 2 corresponding to the display interface 340.

When the user taps the display area 312, the mobile phone may match, from windows that have been opened, a window displayed after the display area 312 is tapped. For example, the matching may be performed based on information such as a package name of a started application. UID of a started application, and an activity corresponding to a started application. When the matched window is the display interface 340, content in the activity stack 2 is migrated to a newly created activity stack 3 in the mobile phone, thereby retaining the display interface 340, and avoiding a data loss caused by restart of the APP 1.

In some other embodiments, the mobile phone may not need to create the new activity stack 3. In this case, when matching the display interface 340, the mobile phone directly migrates the display interface 340 to the mobile phone for display.

With reference to FIG. 3(*b*)-1 and FIG. 3(*b*)-2, the GUIs show a display interface 350 of a mobile phone 300*a* and a display interface 360 of a PC 300*b*.

Content displayed in the display interface 350 of the mobile phone 300*a* is the same as that displayed in the display interface 330*b*, that is, content of the display interface 330*b* is displayed on a screen of the mobile phone 300*a*, and includes a title section and a content section of a document 1.

The display interface 360 of the PC 300*b* includes a display interface 340.

It should be understood that the display interface 340 may retain an original position of the display interface 340 on a screen of the PC, or the display interface 340 may be moved to the middle of the screen of the PC for display, or the display interface 340 may be displayed on another position of the screen of the PC. This is not limited in this embodiment of this application.

In this embodiment of this application, when a plurality of interfaces of a same application are displayed on a PC, and the plurality of interfaces are displayed in a plurality of windows, for example, two or more documents, when the document is opened in an application interface of a mobile phone, a matched document interface is displayed on a screen of the mobile phone. In this technical solution, application restart is avoided, and continuity of switching an application from one screen to another screen can be implemented.

Figure 4:
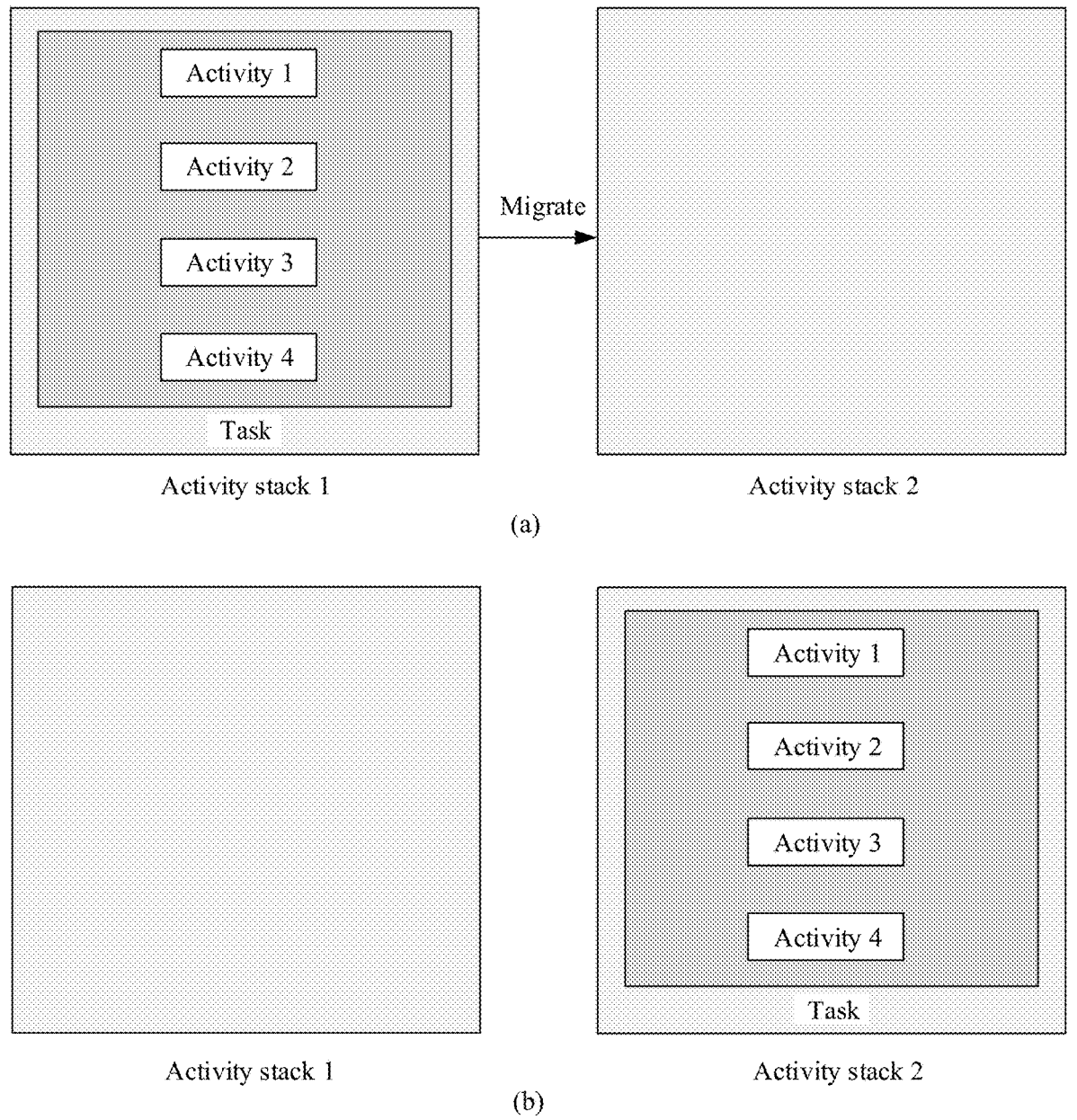
FIG. 4 is a schematic diagram of display interface switching in a display method according to an embodiment of this application.

FIG. 4 is a schematic diagram of display interface switching in a display method according to an embodiment of this application. In this embodiment of this application, an activity stack (activity stack) 1 belongs to a mobile phone side, and an activity stack 2 also belongs to the mobile phone side. An example in which the mobile phone is in a desktop mode and is projected 20) to a PC is used for description.

With reference to (a) in FIG. 4, the activity stack 1 may include one or more tasks, and the task may include a plurality of activities 1 and activities 2.

In an Android system, most of content viewed by a user in an application is provided by an activity component. An application may include a plurality of activities. For example, after the user taps an icon of an application, an activity 1 is started, and a home page of the application is displayed in a display interface of an electronic device. After the user taps an element on the home page, it may be considered that an activity 2 is started, and the display interface of the electronic device is switched from the home page of the application to another interface. In other words, an interface corresponding to the activity 2 covers an interface corresponding to the activity 1, so that the user can view only a current display interface. The activity 2 is located at the top of an activity stack. To be specific, the interface corresponding to the activity 2 may be presented to the user, and some operations of the user may be directly received.

For example, with reference to FIG. 1(*a*)-1 and FIG. 1(*a*)-2, a display interface 110 of the mobile phone may be considered as an interface corresponding to the activity 2. Before the activity 2 is started, when the user taps an application icon of HUAWEI Video on a desktop of the mobile phone, it may be considered that the activity 1 is started. An interface corresponding to the activity 1 is a home page display interface of HUAWEI Video. In this case, the activity 1 is at the top of the activity stack. When the user taps a name of a TV series 1 or a corresponding card in the home page display interface, it may be considered that the activity 2 is started. In this case, the activity 2 is added to the activity stack, and the activity 2 is at the top of the activity stack, so that the mobile phone may display the corresponding display interface 110.

In this embodiment of this application, the mobile phone side starts an application and displays a display interface corresponding to the activity 2. When the user starts a same application on the PC side (for example, double-clicks an application icon of the application on the PC side), the mobile phone side creates an activity stack 2 for the application. In this case, the activity stack 2 may be an empty set. Then, the mobile phone side searches the mobile phone for information such as a package name, a user identity (user identification. UID), and an activity of a started application, to match an optimal window that meets a condition. In this embodiment, when the window matched by the mobile phone side, which is a window currently displayed by the mobile phone or a window in a background, is on the mobile phone, content in the activity stack 1 corresponding to the window is migrated to the activity stack 2, including a task and the activity 1 and the activity 2 included in the task.

With reference to (b) in FIG. 4, when the content in the activity stack 1 is migrated to the activity stack 2, the activity stack 1 is empty, and the activity stack 2 includes the task in the original activity stack 1, the activity 1 included in the task, and the activity 2 included in the task. In a corresponding interface of the PC, a window: displayed on the mobile phone, of the application is switched to the PC for display. In this case, the PC displays the window of the application and displays the display interface corresponding to the activity 2. In addition, a task and an activity sequence of the application are retained, that is, data of the application is retained, and the display interface corresponding to the activity 2 also becomes an interface focus of the PC interface. In other words, the display interface corresponding to the activity 2 may be directly presented to the user, and some operations of the user may be directly received.

In some embodiments, when the application supports a change of a display interface size (resize), the application may be displayed on a desktop of the PC in a form of a floating window: and a size of the floating window may be adjusted. In addition, interface elements in the display interface of the application may be displayed on the desktop of the PC after being re-arranged, that is, the interface element in the display interface may be adjusted as required, thereby improving user experience to some extent.

It should be understood that whether the application supports a change of a display interface size may be preset by a developer of the application. When developing the application, the developer of the application may write whether the application supports a change of a display interface size into source code of the application. In a possible implementation, in an electronic device using an Android system, whether an application supports a change of a display interface size is determined by determining whether the application supports resizing.

In a possible implementation, if code of the application declares that the display interface size of the application cannot be changed, the application is displayed in a full-screen form by default.

In some other embodiments, when the application does not support resizing, or a resizing effect is poor, the application may be displayed in a form of a floating window; but an interface layout of the window may change. For example, sizes or locations of some elements may change. In this case, the mobile phone may restart the current interface, that is, relaunch the display interface corresponding to the activity 2.

Therefore, when a display window of the application is switched from the mobile phone to the PC, the application is not restarted, but an original task and an original activity sequence are retained. In other words, in a process of switching the display window of the application, data of the application is not lost, that is, continuity of switching the application from one screen to another screen can be implemented, thereby improving user experience.

In some other embodiments, if the application does not support resizing or does not support moving to another screen for display, the mobile phone may restart the application, and display the window of the application on a screen of the PC.

In some other embodiments, if the window matched by the mobile phone is already opened on the PC, the window is displayed on a foreground and becomes a focus. In other words, the window may be directly presented to the user, and some operations of the user may be directly received.

It should be understood that, in this embodiment of this application, when the mobile phone establishes a connection relationship with the PC, pixels per inch (dots per inch. DPI) of the screen of the PC may be adapted to DPI of the mobile phone, that is, the DPI of the PC may be set to be the same as the DPI of the mobile phone. When the PC is in a keyboard-removed state or a touchscreen state, or a navigation state changes, a window management service (window manager service, WMS) in the mobile phone intercepts a message that is used for interface relaunching and that is sent by the system to the application, an operation of relaunching the current interface is not performed in the window of the application, thereby improving user experience.

For example, when the PC is in the keyboard-removed state or the touchscreen state, or the navigation state changes, an activity record in the mobile phone may detect a change of an activity, and determine, based on a manifest file of the application, whether to refresh an interface. When it is determined to refresh the interface, a message for interface refreshing may be sent to the application, and the WMS may intercept the message that is used for interface relaunching and that is sent by the activity record to the application, so that the application interface may not be relaunched.

In this embodiment of this application:

Keyboard-removed state: means that a keyboard of the PC changes from a connected state to a disconnected state, or the keyboard changes to a disconnected state and then to a connected state.

Touchscreen state: means that the application may be switched from a screen that can be touched for display to a screen that does not support touching for display.

Change of the navigation state: means that the PC supports an input operation performed by using a trackball or an arrow key. When the trackball or the arrow key changes, it may be considered that the navigation status changes.

It should be understood that in this embodiment of this application, the changes of the foregoing states of the electronic device are used as an example for description, but this shall not constitute any limitation on this application. In some other cases, when a system sends a message for relaunching an interface due to a change of another state of the electronic device, the WMS may still intercept the message for relaunching the interface. This technical solution also falls within the protection scope of this application.

FIG. 5 is a schematic flowchart of a display method according to an embodiment of this application. The method may be applied to a first electronic device and a second electronic device. An example in which the first electronic device is projected to the second electronic device is used. When the first electronic device establishes a connection relationship with the second electronic device, DPI of a screen of the second electronic device may be set to be the same as DPI of the first electronic device. As shown in FIG. 5, the method may include step 510 to step 550.

510: Detect an operation of starting a first application.

For example, with reference to FIG. 1(*a*)-1 and FIG. 1(*a*)-2, the second electronic device may be a PC 100*b*, the first application may be HUAWEI Video on a display desktop of the PC 100*b*, and the operation of starting the first application may be an operation of clicking an application icon 122 of HUAWEI Video by a user by using a mouse.

Step 510 may be performed by the first electronic device, that is, the first electronic device may detect the operation of starting the first application by the user.

It should be understood that the operation of starting the first application may be triggered on the first electronic device, or may be triggered on the second electronic device. This is not limited in this embodiment of this application.

520: Match a window of the first application in the first electronic device.

After the operation of starting the first application is detected, windows of applications that have been started in the first electronic device may be searched for a window that matches the first application. For example, the first electronic device may be searched for information such as a package name. UID, and an activity of a started application. In addition, the information may be compared with related information of the first application, so as to determine whether the first application has been started in the first electronic device. For example, when the first electronic device finds, in the applications that have been started, a package name that is the same as that of the first application, it may be determined that the first application has been started in the first electronic device.

530: Create an activity stack 2 in the first electronic device when it is determined that the matched window is in the first electronic device.

In this step, when it is determined that the window that matches the first application is in the first electronic device, an activity stack 2 may be created in the first electronic device, and an initial status of the activity stack 2 may be an empty set.

In some other embodiments, when it is determined that the window that matches the first application has been projected to the second electronic device, if the window is not on a foreground of the second electronic device, the matched window is moved to the foreground for display.

In some other embodiments, when it is determined that the window that matches the first application does not exist, that is, the first application was not executed before, a new window may be started in the first electronic device, and the new window is projected to the second electronic device for display.

In some other embodiments, if there is no optimally configured window, a second-matched window may be searched for based on affinity of the window.

In some other embodiments, when it is determined that the matched window is in the first electronic device, the first electronic device may not need to create the activity stack 2 but directly project the window to the second electronic device for display.

540: Migrate content of an activity stack 1 in which the window that matches the first application is located in the first electronic device to the activity stack 2.

In this step, the activity stack 1 includes an activity: a task, and the like corresponding to the window that matches the first application of the application. For example, with reference to FIG. 1(*a*)-1 and FIG. 1(*a*)-2, the first application may be HUAWEI Video, and a display interface corresponding to the window that matches the first application of the application may be the display interface 110 of HUAWEI Video in the mobile phone. In this case, the activity stack 1 may include a task, and the task includes an activity 1 corresponding to a home page display interface of HUAWEI Video and an activity 2 corresponding to the display interface 110. Then, the task in the activity stack 1, the activity 1 corresponding to the task, and the activity 2 corresponding to the task are migrated to the activity stack 2.

Optionally, when the content in the activity stack 1 is migrated to the activity stack 2, the first electronic device removes the activity stack 1.

550: Display, on the second electronic device, the matched window of the first application.

After the task in the activity stack 1, the activity 1 corresponding to the task, and the activity 2 corresponding to the task are migrated to the activity stack 2, the first electronic device sends data corresponding to content in the activity stack 2 to the second electronic device, and the matched window of the first application may be displayed on the screen of the second electronic device.

For example, if the first application is a video application, the first electronic device may transmit video data of the application to the second electronic device, and display, on the second electronic device, a window of the first application.

In some embodiments, to adapt to a window management requirement of the second electronic device, a size of the window of the first application may change. For example, the window of the first application is changed from being displayed in a full screen mode on the first electronic device to being displayed in a floating window form on the second electronic device, or being displayed in a full screen mode on the second electronic device. Alternatively, a title bar is added to the display interface corresponding to the window of the first application. The title bar may include a name of the first application, and function controls for controlling minimization, maximization, and closing of the window.

In some embodiments, when the first application supports resizing, the first application may be displayed on a desktop of the second electronic device in a form of a floating window; and a size of the floating window may be changed as the user performs adjustment. In addition, interface elements in the window of the first application may be re-arranged and then displayed on the desktop of the second electronic device, that is, the interface element in the window may be adjusted as required, thereby improving user experience to some extent.

In some embodiments, when the first application does not support resizing, or a resizing effect is poor, the first application may also be displayed in the form of a floating window; but an interface layout of the window may change. If the support effect is still poor, the first application loads the display interface by relaunching (relaunch) the display interface of the current window. In some embodiments, the first application may alternatively be displayed on the second electronic device in a full-screen form by default.

Based on this embodiment of this application, when the window of the application that has been started can be matched in the first electronic device after the application is started in the second electronic device, the window of the application may be migrated to the second electronic device for display, so as to ensure continuity of switching the application from the first electronic device to the second electronic device for display. Therefore, application restart can be avoided, thereby improving user experience.

It should be understood that a specific order of performing step 510 to step 550 is not limited in this embodiment of this application.

Optionally; the method may further include step 560.

560: Detect a state change of the second electronic device.

It should be understood that the state change in this step may include but is not limited to changes of the foregoing keyboard-removed state, touchscreen state, navigation state, and the like.

It should be understood that step 560 may be performed by the first electronic device.

Optionally, the method may further include step 570.

570: Intercept a message that is used for interface relaunching and that is sent to the first application due to a state change.

When the foregoing state changes, a system may send a message for relaunching an interface to the first application. In this case, a WMS in the first electronic device may intercept the message, so that the interface of the first application may not be relaunched.

It should be understood that step 570 may be performed after step 560, or may be performed before step 560. Step 570 may also be performed before or after any step between step 510 and step 550. This is not limited in this embodiment of this application.

This technical solution can avoid unnecessary interface relaunching caused by the foregoing state change, thereby improving user experience.

FIG. 6 is a schematic flowchart of a display method according to an embodiment of this application. The method may be applied to a first electronic device. An example in which the first electronic device is projected to a second electronic device is used for description. The method may include step 610 to step 630.

610: Detect, by the first electronic device, a first operation of starting a first application.

The first operation may be triggered on the second electronic device. With reference to FIG. 1(a)-1 and FIG. 1(a)-2, the first operation may be an operation of clicking the application icon 122 of HUAWEI Video by the user. Alternatively, the first operation may be triggered on the first electronic device.

620: Match, by the first electronic device, a window of the first application.

The first electronic device may match the window of the first application from windows of applications that have been started in the first electronic device.

In an embodiment, the first electronic device may match the window of the first application from the windows of the applications that have been started in the first electronic device based on first information.

The first information may include but is not limited to a package name of the started application, a user identity (UID) of the started application, and an activity corresponding to the started application.

It should be understood that the first electronic device may compare related information of the first application with content included in the first information. When the information can be matched, it may be understood that the first application has been started in the first electronic device. For example, if same content is matched from a window that has been started of the first electronic device based on a package name, an activity, and the like of the first application, it may be considered that the first application has been started in the first electronic device.

630: Migrate the window of the first application to the second electronic device for display, when the first electronic device determines that the matched window of the first application is located in the first electronic device.

The window of the first application may be displayed on the second electronic device in a form of a floating window: or may also be displayed on the second electronic device in a full-screen form.

In some embodiments, when the first application supports resizing, the first application may be displayed on a desktop of the second electronic device in a form of a floating window: and a size of the floating window may be changed as the user performs adjustment. In addition, interface elements in the window of the first application may be re-arranged and then displayed on the desktop of the second electronic device, that is, the interface element in the window may be adjusted as required, thereby improving user experience to some extent.

In some embodiments, when the first application does not support resizing, or a resizing effect is poor, the first application may also be displayed in the form of a floating window; but an interface layout of the window may change. If the support effect is still poor, the first application loads the display interface in a manner of relaunching.

In some other embodiments, when it is determined that the window that matches the first application does not exist, that is, the first application was not executed before, a new window may be started in the first electronic device, and the new window is projected to the second electronic device for display. In some other embodiments, if there is no optimally configured window, a second-matched window may be searched for based on affinity of the window.

In an embodiment of this application, after detecting an operation of starting the first application, the first electronic device matches a window of the first application in windows of applications that have been started. When determining that the matched window of the first application is in the first electronic device, the window of the first application is migrated to a second electronic device for display. In this technical solution, when an application is switched from a first electronic device to a second electronic device for display, data and a status of the application can be retained to avoid restarting the application.

Optionally: the migrating the window of the first application to the second electronic device for display includes: The first electronic device migrates content in a first activity stack corresponding to the window of the first application to a second activity stack. The first electronic device sends data of a window corresponding to the second activity stack to the second electronic device.

It should be understood that, with reference to (a) and (b) in FIG. 4, the first activity stack may be an activity stack 1, the second activity stack may be an activity stack 2, the second activity stack may be created by the first electronic device, and the second activity stack serves the second electronic device, so that a plurality of electronic devices can be managed by stack.

In an embodiment of this application, the first electronic device migrates the content in the first activity stack corresponding to the window of the first application to the second activity stack, so that a task and an activity record in the first activity stack can be retained, that is, data of the first application can be stored. In this way, when the first application is switched to the second electronic device for display, the data of the first application is not lost, thereby improving application continuity.

Optionally: the method may further include: The first electronic device removes the first activity stack. Therefore, system power consumption of the electronic device can be reduced.

Optionally: the window of the first application displayed on the second electronic device further includes a title bar, and the title bar includes at least an application name of the first application.

Figures 1, 2A:
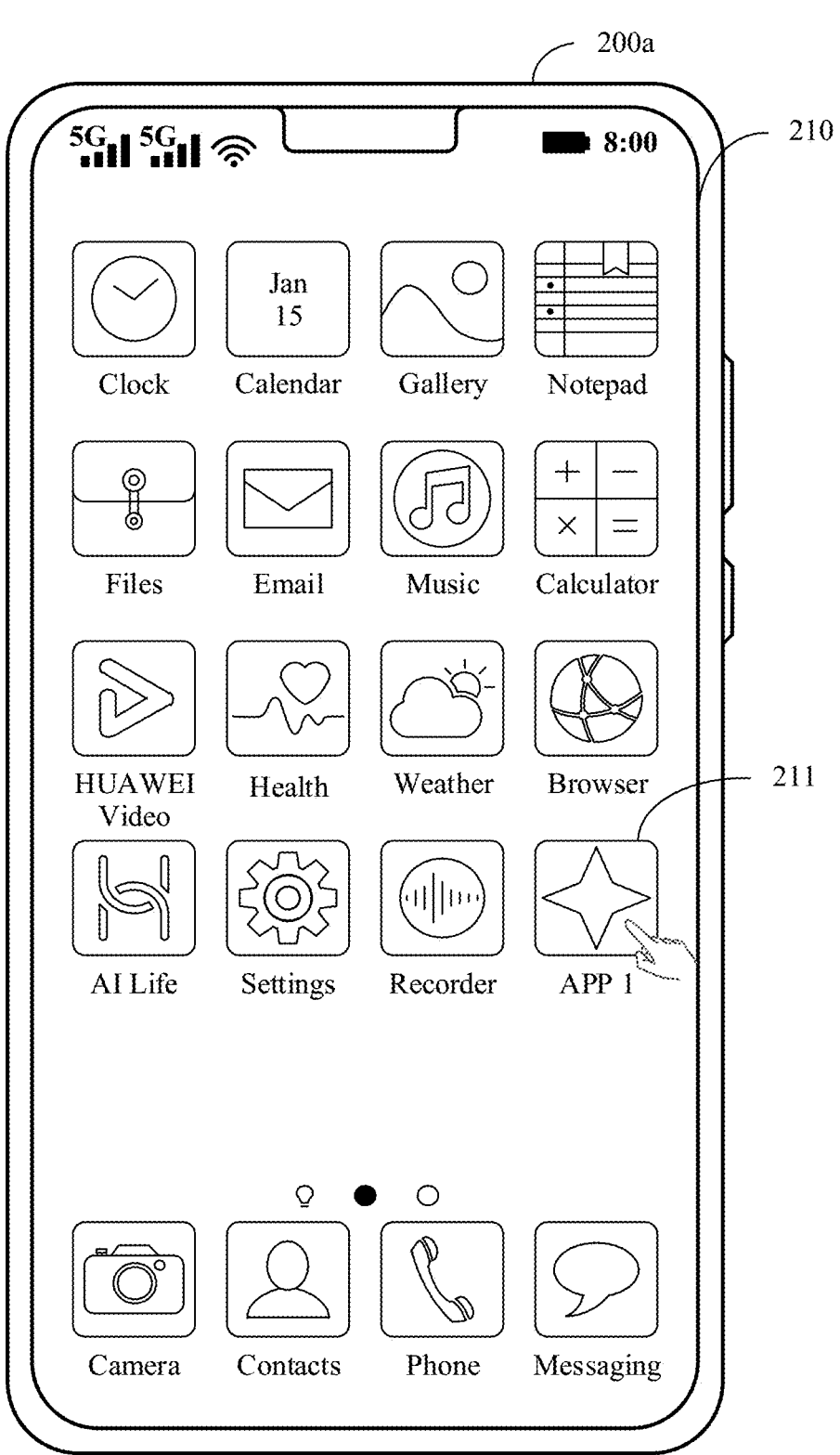
Figures 2, 2A:
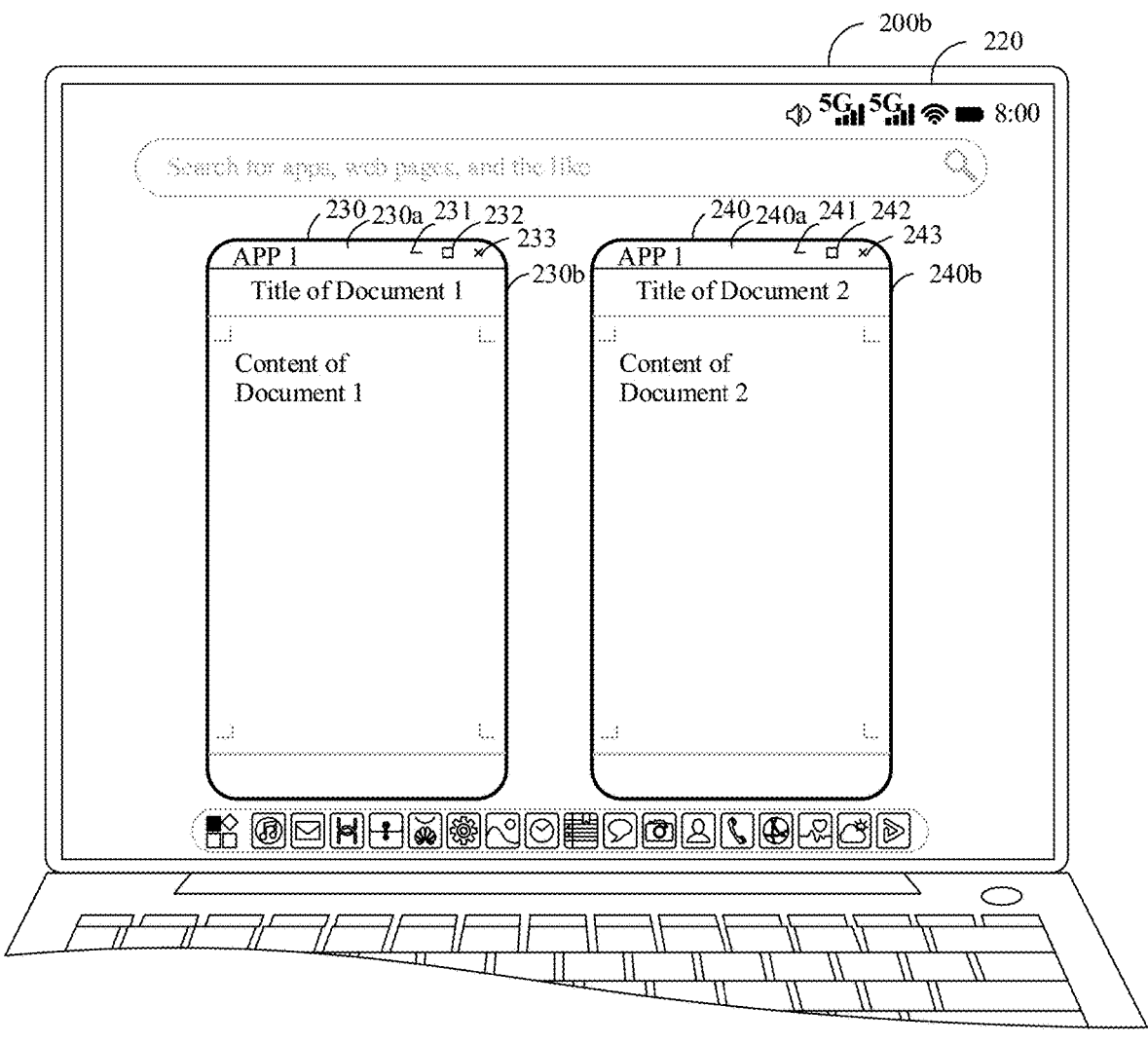
Figures 1, 2B:
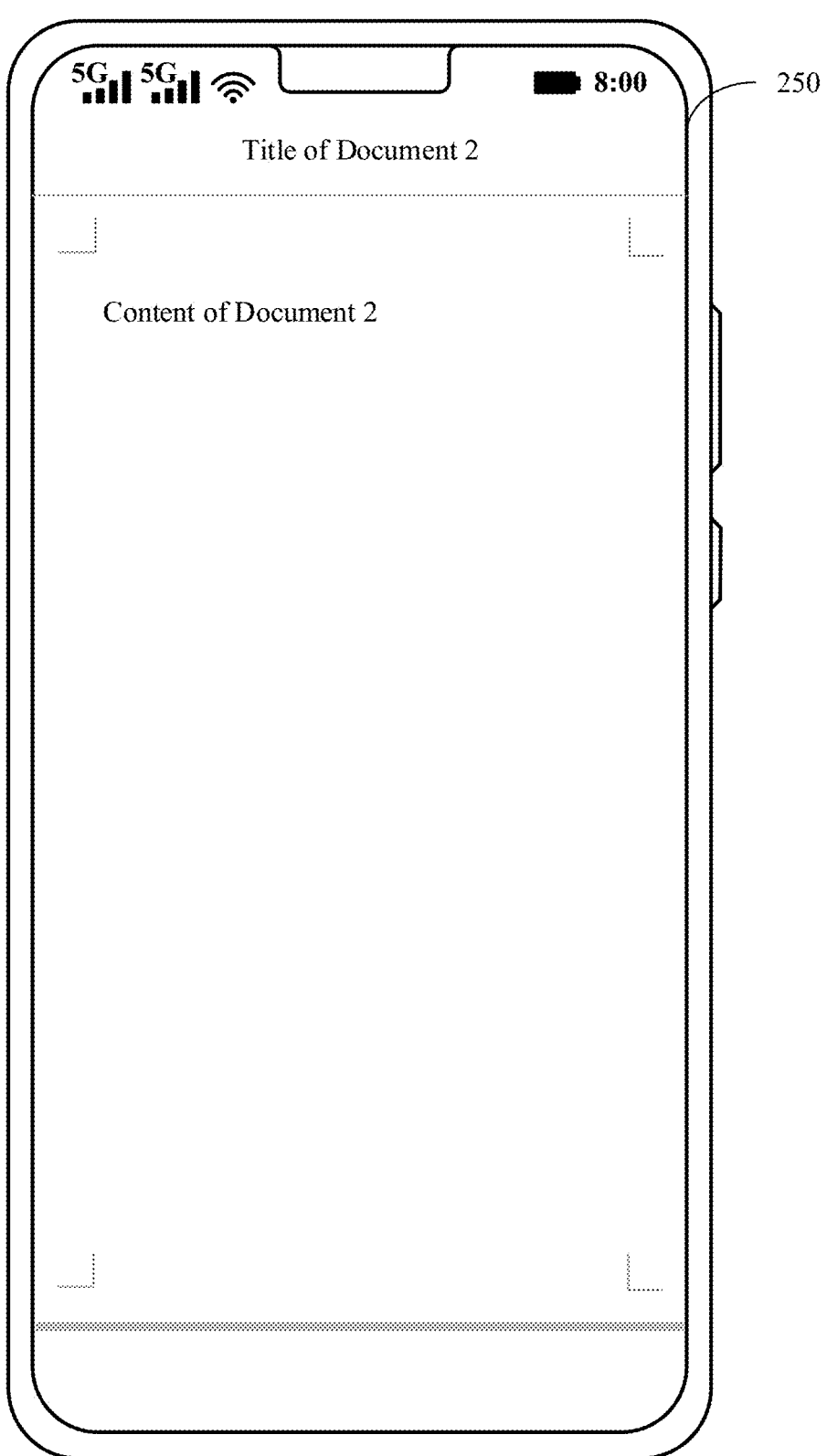
Figures 2, 2B:
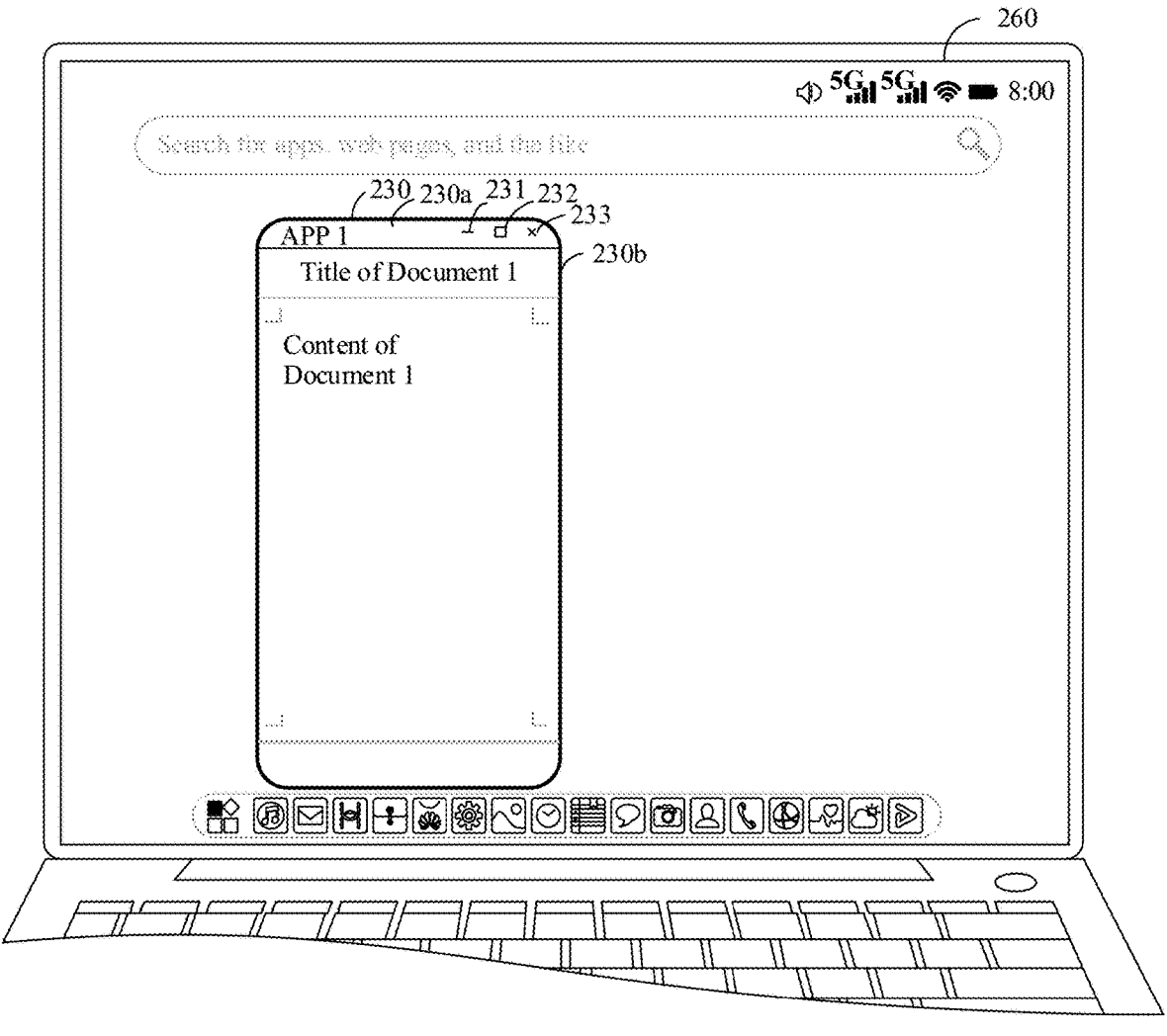
Figures 1, 3A:
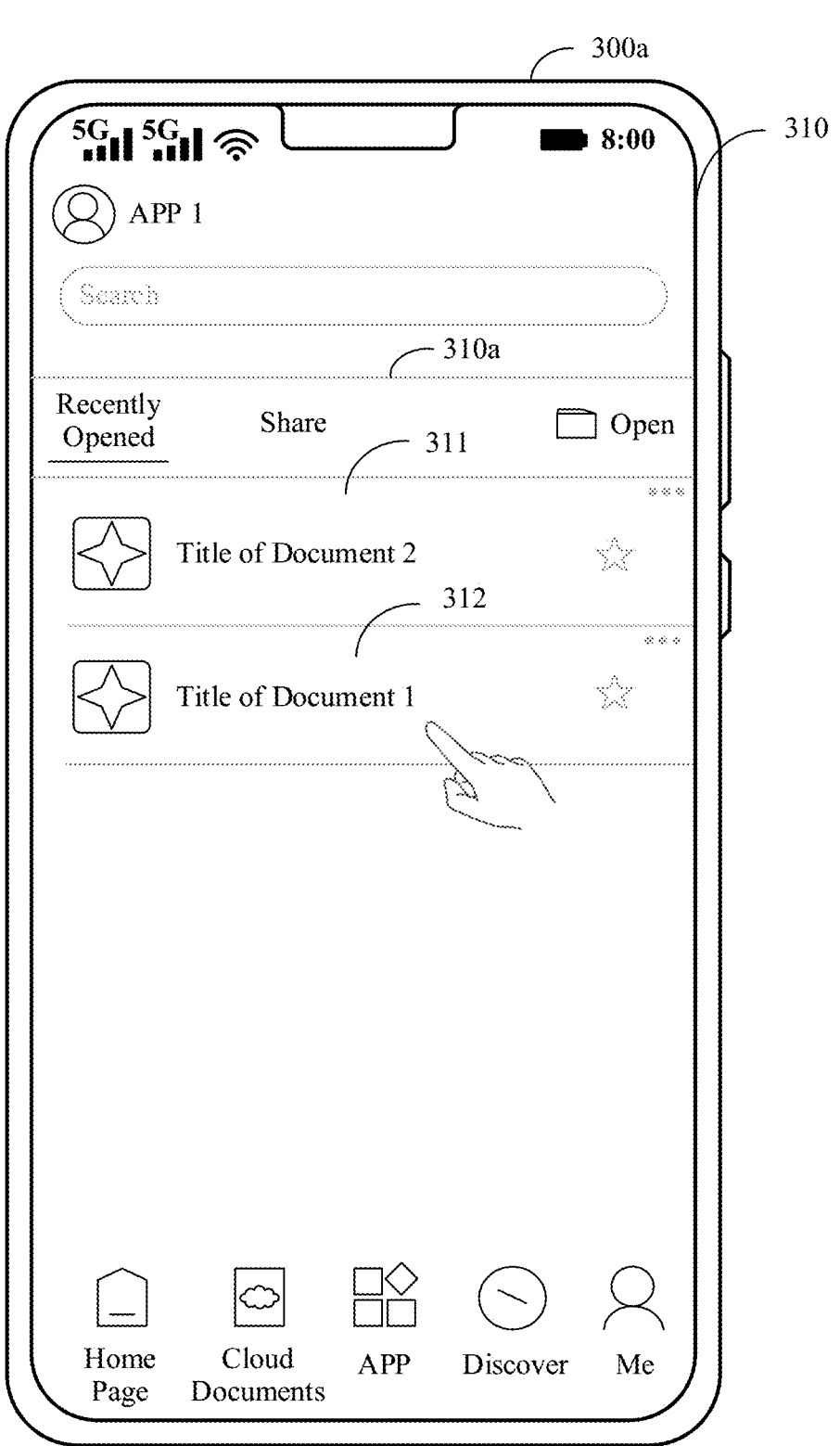
Figures 2, 3A:
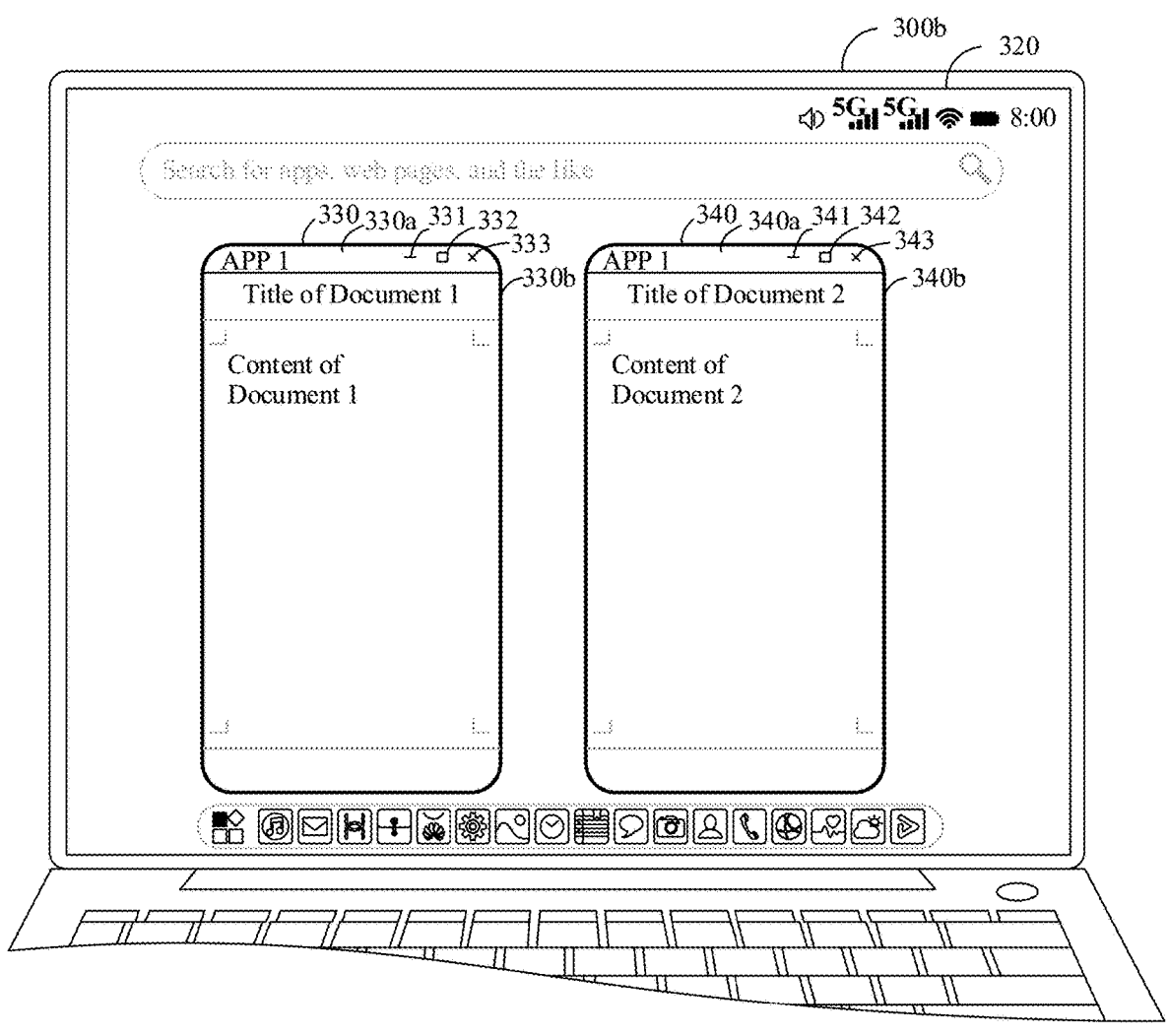
Figures 1, 3B:
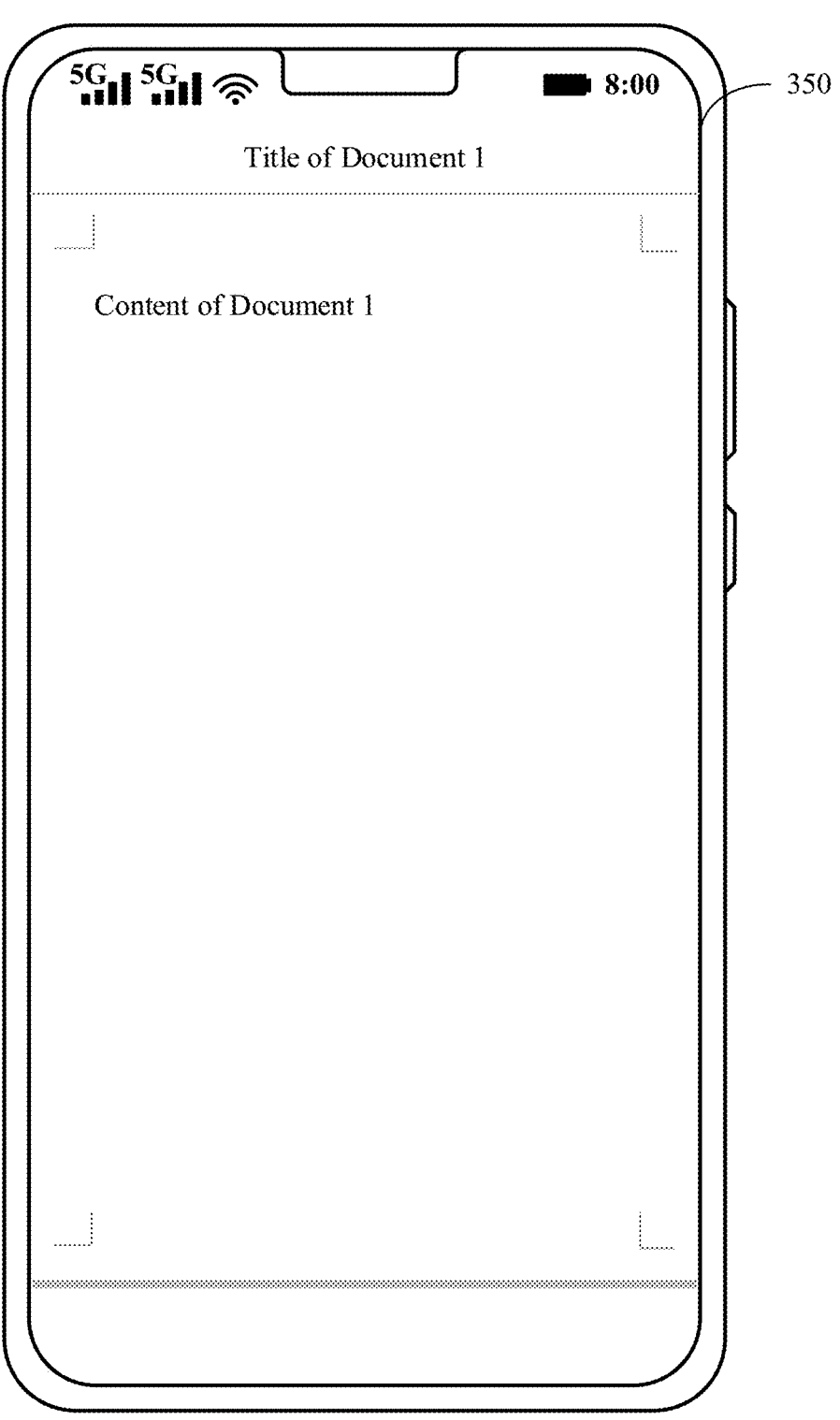
Figures 2, 3B:
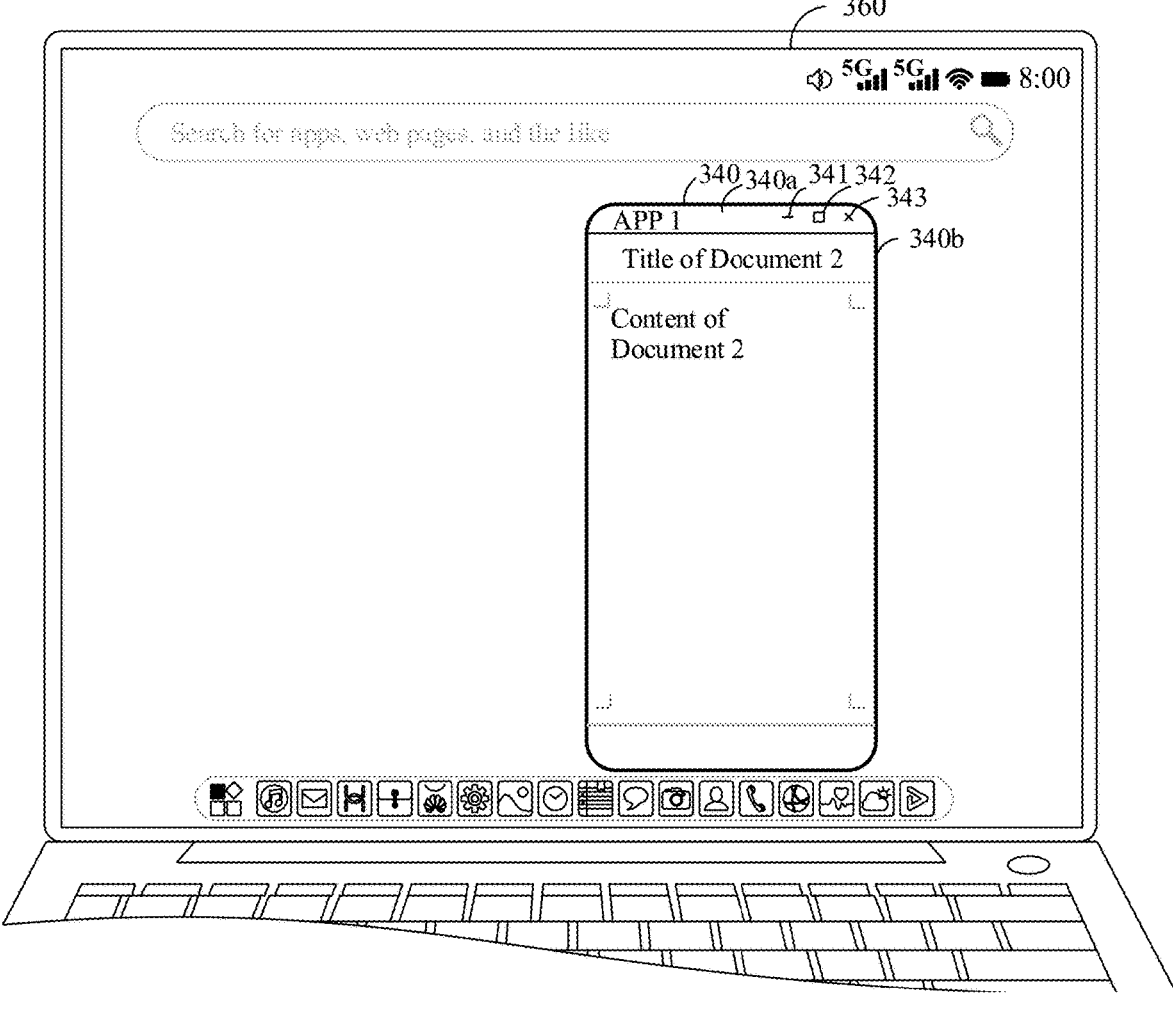

For example, with reference to FIG. 2(a)-1 and FIG. 2(a)-2, the second electronic device may be a PC 200b, and the first application may be an APP 1. In this case, a window or a display interface 230 of the APP 1 displayed by the PC 200b further includes a title bar 230a, and the title bar may include an application name of the APP 1. The title bar may further include some function controls, such as the control 231, the control 232, and the control 233.

Optionally, a size of the window of the first application displayed on the second electronic device is different from a size of the window displayed on the second electronic device.

For example, with reference to FIG. 2(a)-1 and FIG. 2(a)-2, the size of the window or the display interface 230 of the first application displayed on the PC 200b may be different from the size of the window or the display interface 230 of the first application displayed on the mobile phone 200a.

In another example, a size of the window of the first application displayed on the second electronic device may also be the same as a size of the window displayed on the second electronic device.

Optionally, the size of the window of the first application displayed on the second electronic device is adjustable.

In this technical solution, the user may adjust the size of the window of the first application as required, so that user experience can be effectively improved.

Optionally, the method further includes: placing the window of the first application on a foreground for display; when the first electronic device determines that the matched window of the first application is located in the second electronic device.

In this technical solution, when the window of the first application has been projected to the second electronic device, the window of the first application is displayed on the foreground.

Optionally, the method further includes: The first electronic device sets pixels per inch of a screen of the second electronic device to be the same as pixels per inch of a screen of the first electronic device.

It should be understood that, when the first electronic device establishes a connection relationship with the second electronic device, the first electronic device may set the pixels per inch of the screen of the second electronic device to be the same as the pixels per inch of the screen of the first electronic device. This helps ensure a display effect of projection.

Optionally, the method further includes: The first electronic device detects a state change of the second electronic device. The first electronic device intercepts a message that is used for interface relaunching and that is sent by the first electronic device to the first application based on the state change.

The state change may include but is not limited to the foregoing keyboard-removed state or the touchscreen state, or the navigation state changes.

In this technical solution, a display interface corresponding to the window of the first application may be prevented from being relaunched due to a state change of the second electronic device.

Optionally, when the foregoing state change of the first electronic device occurs, and a system sends, to the first application, a message for relaunching an interface, the first electronic device may also intercept the message.

Optionally: the method further includes: The first electronic device determines whether the first application supports a change of a display interface size of a window. When it is determined that the first application supports a change of a display interface size of a window, the migrating the window of the first application to a second electronic device for display includes: migrating the window of the first application to the second electronic device in a form of a floating window for display.

When the first electronic device determines that the first application supports the change of the display interface size of the window, the window of the first application may be displayed on the second electronic device in a form of a floating window: so that user experience can be improved.

Optionally: when it is determined that the first application supports the change of the display interface size of the window; a position of the interface element in the window of the first application may also change or may be adjusted.

An embodiment of this application further provides an electronic device, including one or more processors and one or more memories. The one or more memories store one or more computer programs, the one or more computer programs include instructions, and when the instructions are executed by the one or more processors, the display method in any one of the foregoing possible implementations is performed.

An embodiment of this application further provides a chip. The chip includes a processor and a communication interface. The communication interface is configured to receive a signal and transmit the signal to the processor. The processor processes the signal, so that the display method according to any one of the foregoing possible implementations is performed.

It may be understood that, to implement the foregoing functions, the electronic device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into function modules based on the foregoing method examples. For example, each function module corresponding to each function may be obtained through division or two or more functions may be integrated into one processing module. The integrated module may be implemented in a form of hardware. It should be noted that module division in this embodiment is an example and is merely logical function division. In actual implementation, there may be another division manner.

This embodiment further provides a computer-readable storage medium. The computer-readable storage medium stores computer instructions. When the computer instructions are run on an electronic device, the electronic device is enabled to perform the foregoing related method steps to implement a display method in the foregoing embodiments.

This embodiment further provides a computer program product. When the computer program product is run on a computer, the computer is enabled to perform the foregoing related steps, to implement the display method in the foregoing embodiments.

In addition, this embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the display method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects of the corresponding method provided above. Details are not described herein.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A skilled person may use different methods to implement the described functions for each particular application, but it should not be considered that the implementation goes beyond the scope of this application.

A person skilled in the art may clearly understand that, for the purpose of convenient and brief description, for a specific work process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk drive, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display method performed by a first electronic device, the method comprising:

detecting, by the first electronic device, a first operation associated with starting a first application;

matching, by the first electronic device, a window of the first application in windows of applications that have been started; and when the first electronic device determines that the matched window of the first application is located in the first electronic device, migrating the window and associated content of the first application to a second electronic device for display at the second electronic device and retaining a status of the first application at the first electronic device, wherein migrating the window of the first application to a second electronic device for display comprises:

migrating, by the first electronic device, content in a first activity stack corresponding to the window of the first application to a second activity stack, wherein the second activity stack is newly created by the first electronic device and serves the second electronic device; and sending, by the first electronic device, data of a window corresponding to the second activity stack to the second electronic device;

setting, by the first electronic device, pixels per inch of a screen of the second electronic device to be the same as pixels per inch of a screen of the first electronic device.

2. The display method according to claim 1, wherein the matching, by the first electronic device, a window of the first application comprises:

matching, by the first electronic device based on first information, the window of the first application from windows of applications that have been started in the first electronic device.

3. The display method according to claim 2, wherein the first information comprises at least one of the following items taken singularly or in any combination with one another:

a package name of the started application, a user identity of the started application, or an activity corresponding to the started application.

4. The display method according to claim 1, wherein a window of the first application displayed on the second electronic device further comprises a title bar that includes a name of the first application.

5. The display method according to claim 1, wherein a size of the window of the first application displayed on the second electronic device is different from a size of the window of the first application displayed on the first electronic device.

6. The display method according to claim 1, wherein the size of the window of the first application displayed on the second electronic device is adjustable.

7. The display method according to claim 1, further comprising:

when the first electronic device determines that the matched window of the first application is located in the second electronic device, placing the window of the first application on a foreground of the second electronic device for display.

8. The display method according to claim 1, further comprising: detecting, by the first electronic device, a state change of the second electronic device; and intercepting, by the first electronic device, a message that is used for interface relaunching and that is sent by the first electronic device to the first application based on the state change.

9. The display method according to claim 1, wherein the first operation is triggered on the first electronic device or on the second electronic device.

10. A first electronic device, comprising:

at least one processor; and a memory coupled to the at least one processor and configured to store programming instructions that, when executed by the at least one processor, cause the first electronic device to perform operations comprising:

detecting a first operation associated with starting a first application;

matching a window of the first application in windows of applications that have been started; and when the first electronic device determines that the matched window of the first application is located in the first electronic device, migrating the window and associated content of the first application to a second electronic device for display at the second electronic device and retaining a status of the first application at the first electronic device, wherein migrating the window of the first application to a second electronic device for display comprises:

migrating, by the first electronic device, content in a first activity stack corresponding to the window of the first application to a second activity stack, wherein the second activity stack is newly created by the first electronic device and serves the second electronic device; and sending, by the first electronic device, data of a window corresponding to the second activity stack to the second electronic device; and setting, by the first electronic device, pixels per inch of a screen of the second electronic device to be the same as pixels per inch of a screen of the first electronic device.

11. The first electronic device according to claim 10, wherein the matching a window of the first application comprises:

matching, based on first information, the window of the first application from windows of applications that have been started in the first electronic device.

12. The first electronic device according to claim 11, wherein the first information comprises at least one of the following items taken singularly or in any combination with one another:

a package name of the started application, a user identity of the started application, and an activity corresponding to the started application.

13. The first electronic device according to claim 10, wherein a window of the first application displayed on the second electronic device further comprises a title bar that includes a name of the first application.

14. The first electronic device according to claim 10, wherein a size of the window of the first application displayed on the second electronic device is different from a size of the window of the first application displayed on the first electronic device.

15. The first electronic device according to claim 10, wherein the size of the window of the first application displayed on the second electronic device is adjustable.

16. The first electronic device according to claim 10, wherein the operations further comprise:

when the first electronic device determines that the matched window of the first application is located in the second electronic device, placing the window of the first application on a foreground of the second electronic device for display.

*     *     *     *     *